US012598145B2

(12) United States Patent

Neupane et al.

(10) Patent No.: US 12,598,145 B2

(45) Date of Patent: Apr. 7, 2026

(54) IMAGE VISUALIZATION BASED METHOD TO DETECT COBALTSTRIKE BEACON HTTP C2 COMMUNICATIONS

(71) Applicant: Palo Alto Networks, Inc., Santa Clara, CA (US)

(72) Inventors: Ajaya Neupane, San Jose, CA (US); Yu Fu, Campbell, CA (US); Mei Wang, Saratoga, CA (US); Anand Oswal, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 265 days.

(21) Appl. No.: 18/215,457

(22) Filed: Jun. 28, 2023

(65) Prior Publication Data

US 2025/0007848 A1     Jan. 2, 2025

(51) Int. Cl.
*H04L 47/2441* (2022.01)
*H04L 43/045* (2022.01)
*H04L 67/02* (2022.01)

(52) U.S. Cl.
CPC ........ *H04L 47/2441* (2013.01); *H04L 43/045* (2013.01); *H04L 67/02* (2013.01)

(58) Field of Classification Search
CPC .............................. H04L 43/045; H04L 67/02
See application file for complete search history.

(56) References Cited

U.S. PATENT DOCUMENTS

| | | | | |
|---|---|---|---|---|
| 11,038,906 | B1 * | 6/2021 | Bingham | ............ H04L 63/1425 |
| 12,088,611 | B1 | 9/2024 | Lin | |
| 2004/0240447 | A1 | 12/2004 | Dorbolo | |
| 2010/0195513 | A1 | 8/2010 | Yang | |
| 2013/0128885 | A1 | 5/2013 | Kardashov | |
| 2014/0173729 | A1 | 6/2014 | Cappos | |
| 2016/0021005 | A1 | 1/2016 | Kiyose | |
| 2016/0191384 | A1 | 6/2016 | Shelar | |
| 2017/0026183 | A1 | 1/2017 | Strong | |
| 2020/0076832 | A1 | 3/2020 | Jusko | |
| 2020/0280536 | A1 * | 9/2020 | Kleopa | .............. H04L 47/2441 |
| 2020/0382537 | A1 | 12/2020 | Compton | |
| 2021/0185068 | A1 * | 6/2021 | Cova | .................... H04L 43/067 |

* cited by examiner

*Primary Examiner* — Suraj M Joshi

(74) *Attorney, Agent, or Firm* — Van Pelt, Yi & James LLP

(57)     ABSTRACT

A system, method, and device for detecting Command and Control (C2) traffic is disclosed. The method includes (i) converting a monitored traffic sample to an image representation, (ii) querying a classifier based at least in part on the image representation to obtain a traffic classification, (iii) automatically detecting C2 traffic based at least in part on the traffic classification, and (iv) handling the network traffic based at least in part on the traffic classification.

24 Claims, 16 Drawing Sheets

700

100

200

300

Figure 4A:
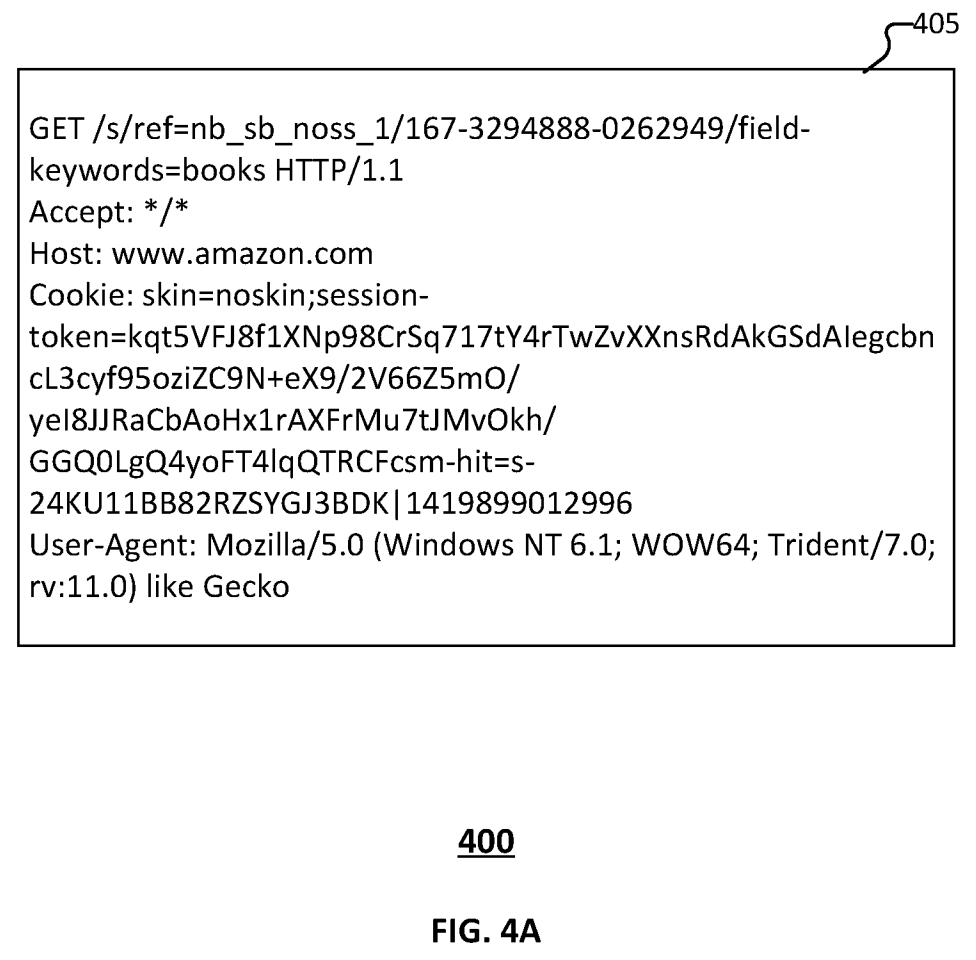

405

GET /s/ref=nb_sb_noss_1/167-3294888-0262949/field-
keywords=books HTTP/1.1
Accept: */*
Host: www.amazon.com
Cookie: skin=noskin;session-
token=kqt5VFJ8f1XNp98CrSq717tY4rTwZvXXnsRdAkGSdAlegcbn
cL3cyf95oziZC9N+eX9/2V66Z5mO/
yeI8JJRaCbAoHx1rAXFrMu7tJMvOkh/
GGQ0LgQ4yoFT4IqQTRCFcsm-hit=s-
24KU11BB82RZSYGJ3BDK|1419899012996
User-Agent: Mozilla/5.0 (Windows NT 6.1; WOW64; Trident/7.0;
rv:11.0) like Gecko

Figure 4B:
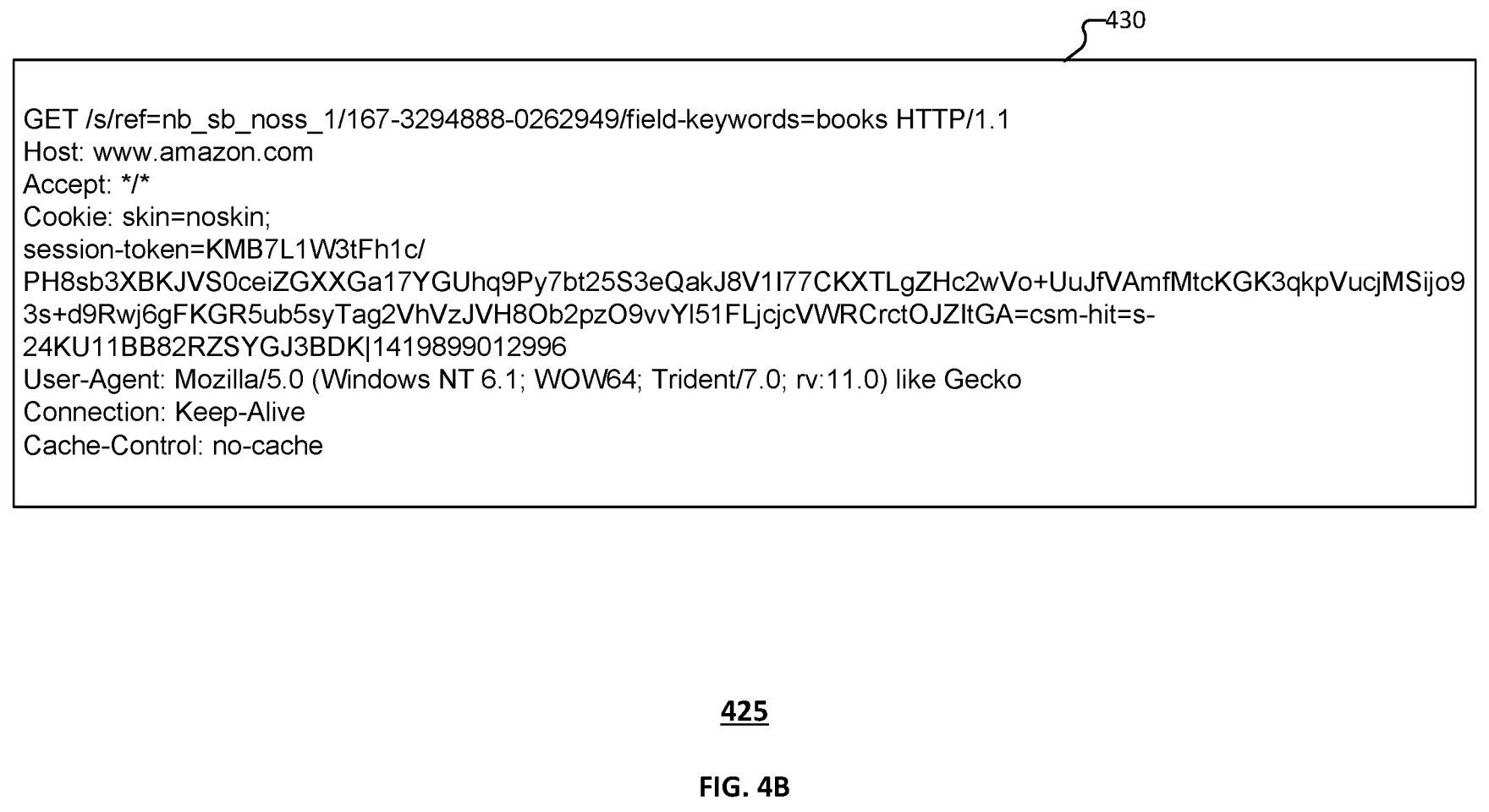

GET /s/ref=nb_sb_noss_1/167-3294888-0262949/field-keywords=books HTTP/1.1
Host: www.amazon.com
Accept: */*
Cookie: skin=noskin;
session-token=KMB7L1W3tFh1c/
PH8sb3XBKJVS0ceiZGXXGa17YGUhq9Py7bt25S3eQakJ8V1I77CKXTLgZHc2wVo+UuJfVAmfMtcKGK3qkpVuqjMSijo9
3s+d9Rwj6gFKGR5ub5syTag2VhVzJVH8Ob2pzO9vvYI51FLjcjcVWRCrctOJZItGA=csm-hit=s-
24KU11BB82RZSYGJ3BDK|1419899012996
User-Agent: Mozilla/5.0 (Windows NT 6.1; WOW64; Trident/7.0; rv:11.0) like Gecko
Connection: Keep-Alive
Cache-Control: no-cache

GET /s/ref=nb_sb_noss_1/167-3294888-0262949/field-keywords=books HTTP/1.1
User-Agent: Mozilla/5.0 (Windows NT 6.1; WOW64; Trident/7.0; rv:11.0) like Gecko
Connection: Keep-Alive
Cache-Control: no-cache
Cookie: skin=noskin;
session-token=KMB7L1W3tFh1c/
PH8sb3XBKJVS0ceiZGXXGa17YGUhq9Py7bt25S3eQakJ8V1I77CKXTLgZHc2wVo+UuJfVAmfMtcKGK3qkpVucjMSijo93s+d9Rwj
6gFKGR5ub5syTag2VhVzJVH8Ob2pzO9vvYI51FLjcjcVWRCrctOJZItGA=csm-hit=s-24KU11BB82RZSYGJ3BDK|141989012996
Accept: */*
Host: www.amazon.com

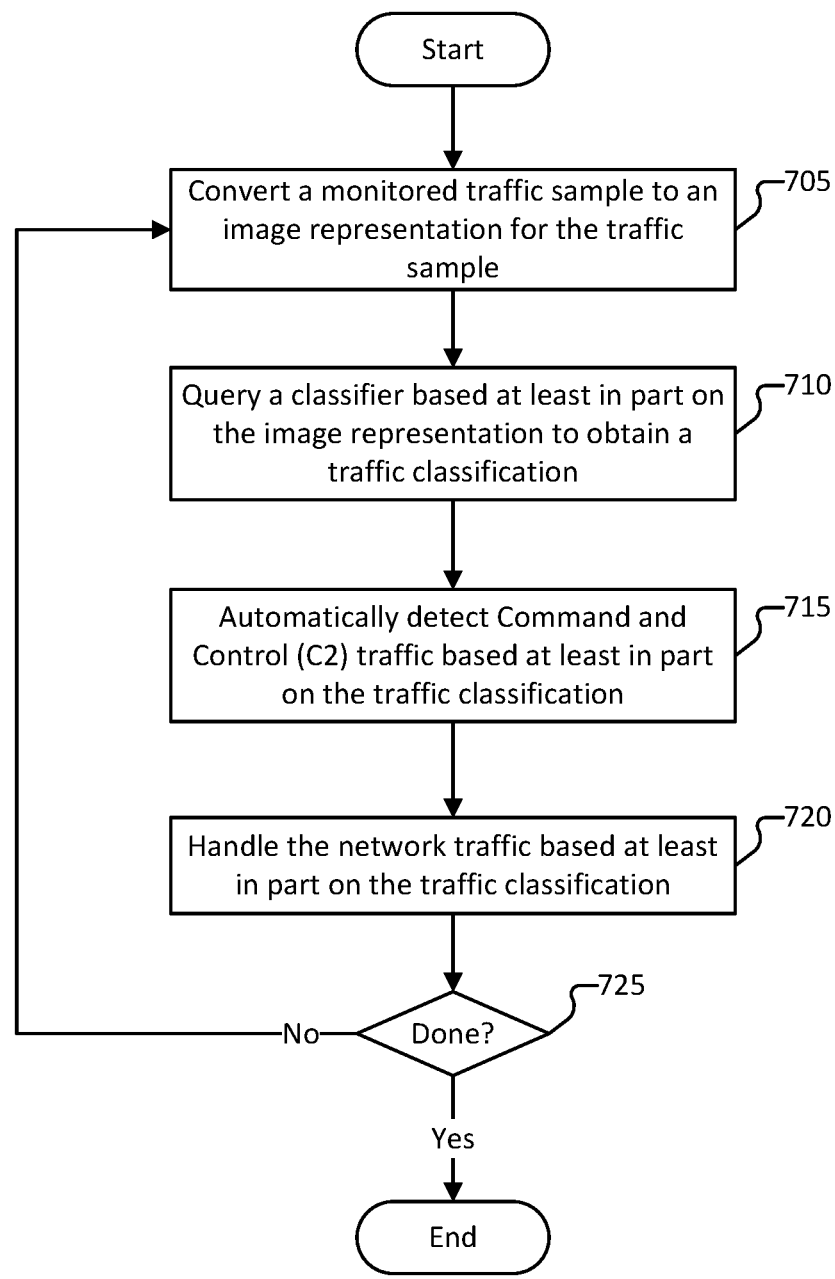

Start

Convert a monitored traffic sample to an image representation for the traffic sample                    705

Query a classifier based at least in part on the image representation to obtain a traffic classification                    710

Automatically detect Command and Control (C2) traffic based at least in part on the traffic classification                    715

Handle the network traffic based at least in part on the traffic classification                    720

725

No — Done?

Yes

End

IMAGE VISUALIZATION BASED METHOD TO DETECT COBALTSTRIKE BEACON HTTP C2 COMMUNICATIONS

BACKGROUND OF THE INVENTION

In today's digital landscape, the prevalence of cyber threats poses a significant challenge to organizations, governments, and individuals alike. Cybercriminals constantly evolve their tactics, making it imperative for security professionals to stay ahead by developing innovative solutions to detect and counteract malicious activities.

One common method employed by attackers is the establishment of a Command and Control (C2) infrastructure. C2 traffic enables hackers to maintain control over compromised devices, allowing them to issue commands, extract data, or launch further attacks. Traditional security measures often struggle to identify C2 traffic due to its covert nature, complex encryption, or obfuscation techniques employed by attackers.

Existing approaches to C2 traffic detection predominantly rely on signature-based or rule-based systems, which can be limited in their effectiveness. Signature-based detection relies on pre-defined patterns or known indicators of compromise (IOCs), making it susceptible to false negatives if attackers modify their techniques. Rule-based systems operate similarly, employing predefined rules to identify specific types of C2 traffic. However, rule-based approaches may struggle to keep up with the rapidly evolving threat landscape, resulting in false positives or missed detections.

Therefore, a need exists for an innovative system and method that can accurately and efficiently detect malicious C2 traffic, regardless of its obfuscation techniques or modifications made by attackers.

BRIEF DESCRIPTION OF THE DRAWINGS

Various embodiments of the invention are disclosed in the following detailed description and the accompanying drawings.

FIG. 4A is an example payload obtained from a first packet of a session for network traffic according to various embodiments.

FIG. 4B is an example of a sample header to be used in connection with detecting C2 traffic according to various embodiments.

FIG. 4C is an example of a sample header that is processed according to various embodiments.

FIG. 7 is a flow diagram of a method for detecting malicious traffic according to various embodiments.

DETAILED DESCRIPTION

Figure 1:
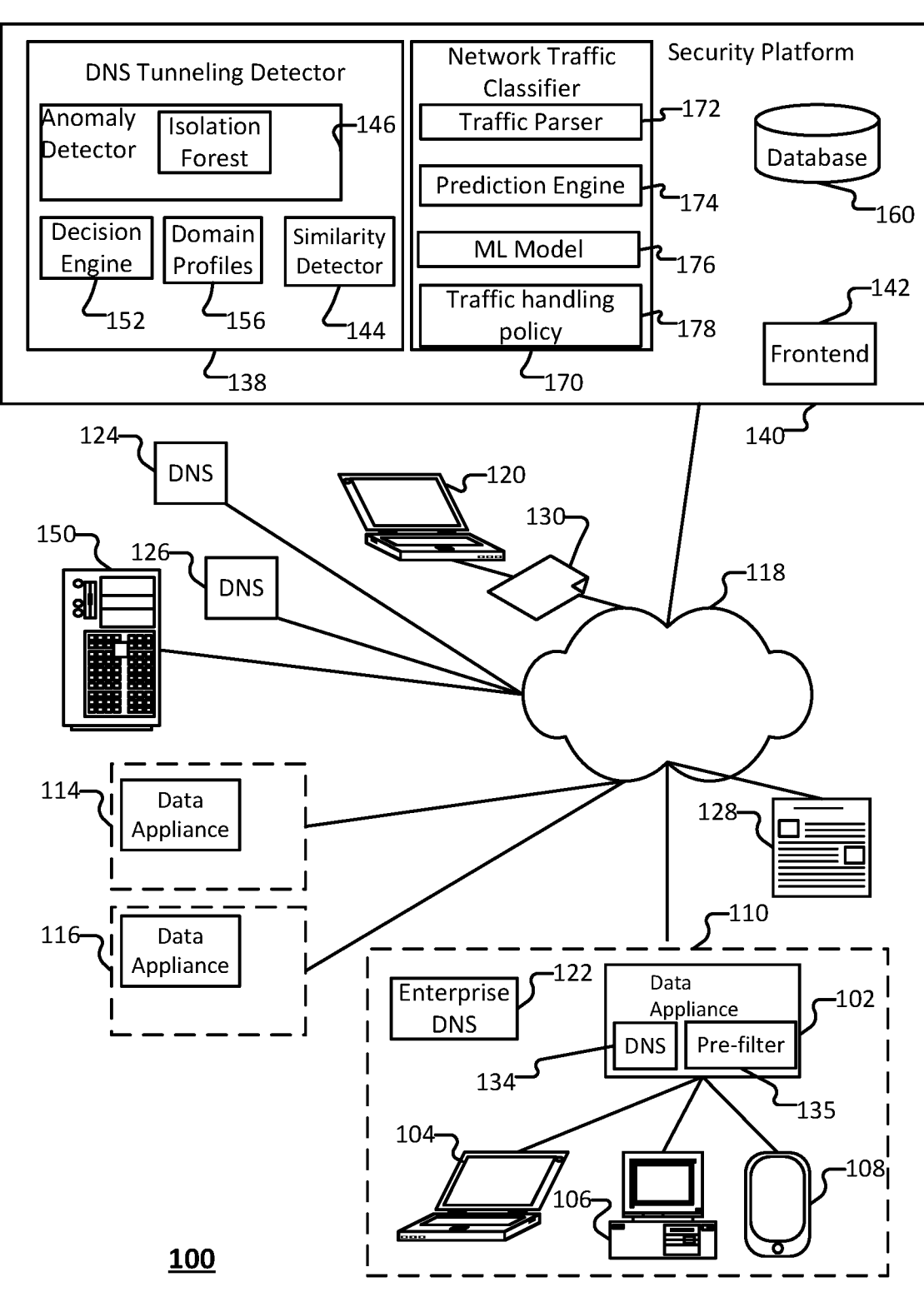
FIG. 1 is a block diagram of an environment for detecting malicious traffic according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments relate to the field of cybersecurity and, more specifically, to systems and methods for detecting and mitigating malicious Command and Control (C2) traffic. The system is configured to identify and analyze these malicious communications, enabling proactive measures to safeguard computer networks, systems, and sensitive data.

As used herein, Command and Control (C2) traffic may include communication between compromised devices and remote attackers who control them. For example, C2 traffic may refer to communication between a compromised system (e.g., often referred to as a bot, a zombie, or a beacon) and a remote server controlled by an attacker. This communication allows the attacker to issue commands and control the compromised system. C2 traffic can be used to carry out a variety of malicious activities, including stealing data, launching DDOS attacks, and spreading malware.

By utilizing cutting-edge technologies such as artificial intelligence, machine learning, and behavioral analytics, various embodiments can identify and differentiate between legitimate network traffic and malicious C2 communications. The system may implement a comprehensive analysis of network behavior, packet-level inspection, and anomaly detection to identify suspicious patterns and activities indicative of C2 traffic.

The system architecture allows for real-time monitoring and analysis, thereby enabling security teams to respond swiftly to emerging threats. The system may continuously learn from new data and evolving attack vectors, and adapt to the ever-changing landscape of cyber threats, enhancing the overall security posture of organizations and minimizing the risk of data breaches, unauthorized access, and system compromise.

Various embodiments provide a system, method, or device for detecting Command and Control (C2) traffic. The method includes (i) converting a monitored traffic sample to an image representation, (ii) querying a classifier based at least in part on the image representation to obtain a traffic classification, (iii) automatically detecting C2 traffic based at least in part on the traffic classification, and (iv) handling the network traffic based at least in part on the traffic classification.

Various embodiments provide a system, method, or device for training a classifier to automatically detect Command and Control (C2) traffic. The method includes (i) obtaining training data (e.g., sample C2 traffic, sample benign traffic, etc.), (ii) training a classifier (e.g., a deep learning model) to learn features to automatically differentiate C2 traffic from benign traffic, and (iii) deploy the classifier. The C2 traffic includes Cobalt Strike beacon, Empire, Silver, Covenant, other C2 traffic types, etc. The deep learning model may be a convolutional neural network (CNN). In some embodiments, the training the CNN includes minimizing entropy-based loss function to update feature scores with penalties for misclassification. For example, the system uses a cost function for the CNN model trained thru stochastic gradient descent and back-propagation. The training the classifier includes converting the training set samples (e.g., the C2 samples or benign samples) to images (e.g., image representations) and training the model to perform a traffic classification based on the images.

In some embodiments, the system uses a classifier to determine a traffic classification with respect to a network traffic sample based at least in part on an image representation of the network traffic sample.

In some embodiments, the system implements a classifier, such as a machine learning model (e.g., a CNN model), to detect malicious traffic (e.g., C2 traffic). The system may comprise a plurality of models that are each respectively configured to detect a particular C2 framework (e.g., the system comprises a Cobalt Strike classifier, an Empire classifier, etc.). Alternatively, the system comprises single machine learning model that is configured to detect C2 traffic across a plurality of different types of C2 frameworks. The single machine learning model works across C2 frameworks to detect C2 traffic based on the use of a unified embedding(s) of features to support multiple C2 frameworks. Examples of C2 frameworks include Cobalt Strike, Empire, Covenant, and Silver, etc.

Related art systems implement a machine learning model to detect C2 traffic, and the model is only able to detect C2 traffic for the particular C2 framework on which the model was trained. Further, related art systems use bespoke models for each type of C2 framework, and the models are developed based on subject matter expert definition of features for the model. The bespoke models are costly (e.g., time-consuming) to train and to re-train. C2 attacks are dynamic with malicious users rapidly developing variations of C2 attacks. As a result, related art systems are ineffective in detecting new C2 exploits. Further, related art systems are generally trained using Support Vector Machines (SVM), Naïve-Bayesian (NV), or Random Forests (RF) machine learning processes.

Various embodiments implement a CNN model to perform network traffic classification (e.g., detect C2 traffic). The system generates an image representation for a network traffic sample, and the CNN model is used to classify the network traffic sample based on the image representation. According to various embodiments, the system automatically learns the features (e.g., the system automatically generates the image representation features, such as embeddings, to be implemented). The system is thus more efficient and scalable than related art systems that rely on manual definition of the feature vectors. Further, the system may be more simply re-trained to update the model as a new C2 attack(s) or model drift occurs. Tests of a system for detecting malicious/C2 traffic have found that the model has a high detection rate (e.g., 95% accuracy on a malicious dataset) and a low false positive rate (e.g., less than 0.3% false positive rate on a benign dataset). Accordingly, various embodiments are an effective solution for zero-day detection. The system enables feature engineering (e.g., automatic determination of features), re-training consistency, effective detection accuracy, and effective detection latency. The classifier performs traffic classification having a detection accuracy greater than 90% with a latency of less than 20 milliseconds, and preferably less than 10 milliseconds. In some embodiments, the classifier performs traffic classification having a detection accuracy greater than 90% with a latency of less than 7 milliseconds.

In some embodiments, the system implements a cross-framework C2 model training. At the training stage, in order to train a model across a plurality of C2 frameworks, the system collects HTTP header samples generated by different C2 traffics (e.g., Cobalt Strike, Empire, Deimos, etc.) and performs the training against the collected HTTP header samples and a set of benign HTTP header samples. Not all the HTTP headers follow the same sequence. The system predefines a header order and reorders all the HTTP request orders to have the same order, which reduces the training complexity for a model that detects C2 traffic across a plurality of C2 frameworks. A HTTP header could comprise some customized data such as a cookie or token information. For C2 traffic of the same C2 framework, the HTTP headers are mostly the same but with different cookie values. However, even though the samples have different cookie values, the samples share similar patterns. In some embodiments, the system formats the variable with patterns (e.g., using patterns for detection rather than the underlying values). In addition, many C2 attacks comprise session secrets in a HTTP header, such as a cookie header. A pattern in the alphanumeric value of the cookie/session secret can be indicative of the type of encoding used to encode the cookie/session secret. Various embodiments use these patterns to re-format the header to include a cookie/session secret representation, such as a tuple of the type of encoding and the length. The cookie/session secret values are replaced by the cookie/session secret representation. Alternatively, the cookie/session secret representation is inserted into a particular HTTP header, such as the cookie header, to obtain a processed header (e.g., a normalized header). The system uses the normalized header to determine the header embeddings that are used by the model to predict a traffic classification.

In some embodiments, a classifier that does automatic pattern identification and detection of cobalt strike communication in real time is trained. The training the classifier includes (i) extracting a byte stream of the first request header in a flow, (ii) resizing one dimensional byte stream to two dimensional matrix, (iii) padding the two-dimensional matrix with zero or trimming the stream to make a perfectly square matrix, (iv) converting the two dimensional matrix to an image, (v) identifying/determining features of Cobalt Strike (or other applicable C2 framework for which the classifier is being trained) from the training images based on an applying convolutional filters, (vi) applying a pooling of feature scores to reduce overfitting, (vii) applying a fully connected neural networks on feature scores to predict the label of a session based on a probabilistic score, (viii) minimizing entropy-based loss function to update feature scores with penalties for misclassification, and (ix) augmenting training data to prevent adversarial ML attacks. The entropy-based loss function is a cost function, such as cost function in Equation (1), where y is the true probability of the label, and p is the predicted probability. For example, the predicted probability sets 1=C2 traffic (e.g., Cobalt Strike traffic) and 0=benign. According to Equation (1), when a mistake is made for a benign file/traffic, the cost/loss function approaches infinity. Similarly, when a mistake is made for a malicious file, the cost/loss function approaches infinity.

$$\text{Cost Function}(E) = -\sum_{n=1}^{N}(y\log(p) + (1 - y)\log(1 - p)) \qquad (1)$$

FIG. 1 is a block diagram of an environment for detecting malicious traffic according to various embodiments. In various embodiments, system 100 is implemented in connection with system 200 of FIG. 2, system 500 of FIG. 5, system 600 of FIG. 6, process 300 of FIG. 3, process 700 of FIG. 7, process 800 of FIG. 8, process 900 of FIG. 9, process 1000 of FIG. 10, process 1100 of FIG. 11, and/or process 1200 of FIG. 12.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic,) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign).

In various embodiments, results of analysis (and additional information pertaining to applications, domains, etc.), such as an analysis or classification performed by security platform 140, are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, network traffic classifier 170 detects/classifies network traffic. For example, the network traffic classifier determines the application (e.g., an application identifier) to which a sample of network traffic corresponds. As another example, the network traffic classifier determines whether traffic corresponds to C2 traffic. In some embodiments, network traffic classifier 170 classifies the sample based at least in part on a signature of the sample, such as by querying a mapping of signatures to applications/application identifiers (e.g., a set of previously analyzed/classified applications). In some embodiments, network traffic classifier 170 classifies the sample based on a predicted traffic classification (e.g., a prediction of whether traffic is C2 traffic, whether the traffic is a particular type of C2 traffic, or whether sampled traffic is malicious traffic, etc.). For example, network traffic classifier 170 determines (e.g., predicts) the traffic classification based at least in part on payload information from a first HTTP session (e.g., information from a first request header), header information for the traffic, etc. Network traffic classifier 170 may automatically detect a plurality of types of C2 frameworks in connection with determining whether the traffic is malicious. For example, network traffic classifier 170 includes a model (e.g., ML model 176) that is trained to detect the plurality of C2 frameworks. Additionally, or alternatively, network traffic classifier 170 may automatically detect a particular type of C2 traffic. For example, network traffic classifier 170 includes a model that is trained to specifically detect a particular C2 framework. System 100 may store a first model to detect Cobalt Strike C2 traffic, a second model to detect Empire C2 traffic, a third model to detect Covenant C2 traffic, etc.

In response to determining a predicted classification for a sample (e.g., a traffic sample), network traffic classifier 170 may determine a signature (e.g., a hash for the payload or header information, etc.) for the sample and store in a mapping of signatures to traffic classifications (e.g., an indication of whether the sample is malicious or benign/non-malicious) the sample signature in association with the predicted classification. In some embodiments, in response to determining a predicted classification for a sample (e.g., a traffic sample), network traffic classifier 170 may store an association between the IP address for network traffic and an indication of whether the traffic is malicious or benign/non-malicious. For example, network traffic classifier 170 identifies an IP address to/from which C2 traffic is being communicated (e.g., an IP address for the client device corresponding to a beacon in the C2 framework). Security platform 140 may manage a whitelist of signatures or IP addresses for network traffic that is deemed benign, or a blacklist of signatures or IP addresses for network traffic that is deemed malicious. The whitelist or blacklist may be provided to inline security entities (e.g., firewalls) for inline detection of malicious network traffic or benign network traffic.

In some embodiments, system 100 (e.g., network traffic classifier 170, security platform 140, etc.) trains a classifier (e.g., a model) to detect (e.g., predict) traffic for applications. For example, system 100 trains a classifier to perform traffic classification (e.g., to classify traffic as malicious or benign/non-malicious). As another example, system 100 trains a classifier to determine whether a traffic sample corresponds to C2 traffic. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a convolutional neural network (CNN), etc. In some embodiments, network traffic classifier 170 implements a CNN model.

System 100 (e.g., network traffic classifier 170, security platform 140, etc.) performs feature extraction with respect to the sample traffic, such as performing feature extraction for the sample traffic (e.g., header embedding on header information, a set of features for the payload in the first packet of a network traffic session). In some embodiments, system 100 (e.g., network traffic classifier 170) generates a set of features for training a machine learning model for classifying the traffic (e.g., classifying whether the traffic is malicious/non-malicious). System 100 then uses the set of features (e.g., embeddings) to train a machine learning model (e.g., a CNN model) such as based on training data that includes benign samples of network traffic and malicious samples of network traffic.

According to various embodiments, security platform 140 comprises DNS tunneling detector 138 and/or network traffic classifier 170. Security platform 140 may include various other services/modules, such as a malicious sample detector, a parked domain detector, an application classifier or other traffic classifier, etc. Network traffic classifier 170 is used in connection with analyzing samples of network traffic and/or automatically detecting C2 traffic. For example, network traffic classifier 170 analyzes a sample (e.g., a packet(s) of network traffic, such as a first packet of an HTTP session, such as a packet comprising header information) and predicts whether the network traffic is malicious or otherwise corresponds to C2 traffic. Network traffic classifier 170 may detect whether the network traffic corresponds to a particular C2 framework. In response to receiving an indication that an assessment of a sample of network traffic (e.g., C2 type classification, determine whether the malicious/benign, etc.) is to be performed, network traffic classifier 170 analyzes the sample to determine the assessment of the network traffic (e.g., C2 traffic classification, determine whether the sample is malicious or benign/non-malicious, etc.). For example, network traffic classifier 170 extracts payload information (e.g., header information) from the sample, processes the header information (e.g., convert the header information to a predefined format), determines an embedding(s) or other feature vector for the header, and uses a machine learning model (e.g., a CNN model) to determine a machine learning-based predicted classification.

In some embodiments, in connection with determining the machine learning-based prediction classification, network traffic classifier 170 (*i*) receives an indication of a sample, (ii) obtains information pertaining the sample (e.g., header information, etc.), (iii) determines a feature vector for the sample based on the information pertaining to the sample (e.g., determines a header embedding(s)), (iv) queries a model (e.g., a machine learning model), and (v) determines a C2 type, a traffic classification, or otherwise whether the traffic is malicious/benign based on the querying the model (e.g., network traffic classifier 170 obtains a predicted classification). In some embodiments, the determining the feature vector for the sample (e.g., determining the header embeddings) includes (a) parsing of the information pertaining to the sample, (b) obtaining header information for the sample, (c) process the header information to convert the header to a predefined format, (c) and (iii) generating the feature vector or header embeddings based at least in part on the header information in the predefined format.

In some embodiments, network traffic classifier 170 classifies the traffic based on HTTP request data. For example, network traffic classifier 170 obtains a sample of HTTP request data being communicated across a network and uses the HTTP request sample in connection with detecting C2 traffic or otherwise determining whether the associated traffic is malicious/non-malicious. The network traffic classifier 170 may obtain payload information from the first packet in an HTTP session, and classifies the traffic based at least in part on the payload information.

In some embodiments, network traffic classifier 170 classifies the traffic based at least in part on extracting payload information from the network traffic (e.g., the first packet in the HTTP session), generating an image based on the payload information (e.g., an image representation of the payload), and predicting whether the traffic corresponds to C2 traffic (e.g., a particular C2 framework) based at least in part on the image. The image may be generated according to a predefined process, including squaring the data extracted from the payload information (e.g., data encoded based on the payload), generating an image of a particular dimensionality, etc.

In some embodiments, network traffic classifier 170 comprises one or more of traffic parser 172, prediction engine 174, ML model 176, and/or traffic handling policy 178.

Traffic parser 172 is used in connection with determining a payload (e.g., header information comprised in a first packet of an HTTP session) for network traffic (e.g., the traffic sample being analyzed). Traffic parser 172 obtains the first packet in an HTTP session and extracts header information from the sample.

In response to extracting the header information, traffic parser 172 generates an image representation for the network traffic (e.g., a representation of the header information). Generating the image representation may include decoding the payload information (e.g., using the applicable encoding, such as base64, base64url, netbios, and netbiosu), obtaining a byte string based on the decoded payload information, converting (e.g., reshape) the byte string to a two-dimensional array/matrix, and resizing the two-dimensional array/matrix to a predefined dimensionality (e.g., 32×32, 64×64, or 128×128, etc.). Obtaining the byte string may include converting the bytes to respective ASCII values. The two-dimensional array/matrix is generated to be perfectly square. For example, zero padding or trimming may be performed on the byte string or the two-dimensional array/matrix after conversion of the byte string to the two-dimensional array matrix. The image data for the image representation is obtained in response to the resizing of the two-dimensional array/matrix.

In some embodiments, generating the image representation includes formatting the payload/header information according to a predefined format (e.g., a predefined header format). The payload/header information may be formatted according to the predefined format in connection with generating a classifier that detects C2 traffic for a plurality of C2 frameworks (e.g., a unified classifier). Formatting the payload/header information according to the predefined format may include traffic parser 172 ordering fields or information comprised in the header information into a predefined order. For example, traffic parser 172 formats cookie headers within the header information according to a predefined cookie header format. In some embodiments, formatting the header information according to the predefined format normalizes the information to be analyzed according to a machine learning model (e.g., a CNN model) to provide a generic detection across a plurality of types of C2 frameworks. Related art system required a plurality of models, each of which is trained to detect a particular C2 framework (e.g., only Cobalt Strike, or only Empire, etc.) and thus ineffective to detect traffic for other types of C2 frameworks. For example, a related art system deploying a model to detect Cobalt Strike traffic is ineffective in detecting Empire traffic.

Decoding the payload includes determining an encoding used to encode the header. Examples of encodings include base64, base64url, netbios, and netbiosu. Various other encodings may be implemented. In some embodiments, traffic parser 172 determines the particular encoding for a cookie in the headers. As an example, the encoding is determined based on a syntax for the cookie comprised in the header. As another example, a predefined set of rules or heuristics are used to detect a type of encoding used to encode the cookie. Examples of heuristics include (i) the presence of a special character in the cookie, (ii) the presence of the % character in the cookie, (iii) the presence of uppercase characters, and/or (iv) all alphabetic characters in the cookie are lower case. Various other types of rules or heuristics may be implemented. For example, a system may be trained to detect other patterns in the header or the cookie header in particular (e.g., attackers often put the session secrets in the http cookie header).

Network traffic classifier 170 determines features (e.g., embeddings) associated with the sample being analyzed. For example, traffic parser 172 determines header embeddings for the header information comprised in the sample, such as after the header information has been formatted according to the predefined header format.

Prediction engine 174 is used in connection with predicting a classification for the sample, detecting C2 traffic, or otherwise predicting whether the corresponding traffic is malicious/non-malicious. For example, prediction engine 174 predicts whether the network traffic associated with the sample is C2 traffic or malicious traffic. Prediction engine 174 may detect C2 traffic or malicious traffic (e.g., predict whether the traffic is malicious/non-malicious) based at least in part on the features for the sample (e.g., the header embeddings obtained by traffic parser 172). In some embodiments, prediction engine 174 uses a machine learning process to analyze the sample/detect whether the traffic is C2 traffic (e.g., C2 traffic corresponding to a particular C2 framework) or otherwise malicious traffic. As an example, the machine learning process includes use of a CNN. Using the machine learning process to analyze the sample and/or detect C2 traffic or otherwise malicious traffic may include querying a classifier (e.g., a model), such as ML model 176. For example, prediction engine 174 queries the classifier based at least in part on the embeddings determined for the sample.

In some embodiments, the classifier (e.g., ML model 176) is trained using a machine learning process. For example, the classifier is a CNN model. The CNN model may be trained from a training set comprising a subset of benign samples and a subset of malicious samples (e.g., a set of C2 traffic samples, such as C2 traffic of a particular type of C2 framework for which the classifier is being trained). In the case of training a unified classifier that detects C2 traffic for a plurality of types of C2 frameworks, the samples in the training set may be formatted in accordance with the predefined format. For example, the samples in the training set are HTTP request samples, and the headers for the sample HTTP requests are formatted according to the predefined header format. The features (e.g., the header embeddings) are an efficient and dense representation in which similar words or strings have a similar encoding.

In some embodiments, the features (e.g., the embeddings for the classifier) are not defined manually by a subject matter expert. For example, the encoding for the features or feature vectors is not manually defined by a subject matter expert in the same manner that related art feature vectors are developed. Rather, the features or embeddings are trainable parameters that may be trained automatically.

In connection with predicting a classification for a sample, prediction engine 174 applies a machine learning model to determine whether a particular sample of network traffic is C2 traffic, whether the sample is malicious, or whether the sample is benign/non-malicious. Applying the machine learning model to determine an application to which the sample corresponds includes querying the machine learning model, such as querying the model with information pertaining to the payload information (e.g., the header information comprised in a first packet of an HTTP session). As an example, the model is queried using a header embedding that is generated based on an encoding of header information for the sample. In some implementations, the machine learning model is pre-trained and prediction engine 174 does not need to provide a set of training data (e.g., sample HTTP requests data for benign traffic or malicious/C2 traffic, etc.) to the machine learning model. Prediction engine 174 receives a result (e.g., verdict) of a determination or analysis by the machine learning model. In some embodiments, prediction engine 174 receives, from the machine learning model (e.g., ML model 176), an indication of a likelihood that the sample corresponds to C2 traffic, a likelihood that the sample is malicious, or a likelihood that the sample is benign/non-malicious. In response to receiving the indication of the likelihood that the sample corresponds to C2 traffic, a likelihood that the sample is malicious, or a likelihood that the sample is benign/non-malicious, prediction engine 174 determines (e.g., predicts) a traffic classification based on such likelihood. For example, prediction engine 174 compares the likelihood that the sample corresponds to C2 traffic to a likelihood threshold value. In response to a determination that the sample corresponds to C2 traffic is greater than the likelihood threshold value, prediction engine 174 may deem (e.g., determine that) the sample corresponds to C2 traffic.

According to various embodiments, in response to prediction engine 174 classifying the sample, system 100 handles the sample or traffic matching the sample (e.g., a traffic having a signature the same as the sample, traffic originating from the same IP address as the sample, etc.) according to a predefined policy. For example, the system queries traffic handling policy 178 to determine the manner by which traffic matching the sample is to be handled. Traffic handling policy 178 may be a predefined policy, such as a security policy, etc. Traffic handling policy 178 may indicate that traffic for certain applications is to be blocked and traffic for other applications is to be permitted to pass through the system (e.g., routed normally). Traffic handling policy 178 may correspond to a repository of a set of policies to be enforced with respect to network traffic. In some embodiments, security platform 140 receives one or more policies, such as from an administrator or third-party service, and provides the one or more policies to various network nodes, such as endpoints, security entities (e.g., inline firewalls), etc.

In response to determining a classification for a newly analyzed sample, security platform 140 (e.g., network traffic classifier 170) sends an indication that traffic matching the sample is associated with, or otherwise corresponds to, the determined classification. In the case that the determined classification is C2 traffic, security platform provides an indication that traffic matching the sample (e.g., the same sample signature or same originating IP address, etc.) is also deemed C2 traffic. For example, security platform 140 computes a signature for the sample (e.g., a hash or other signature), and sends to a network node (e.g., a security entity, an endpoint such as a client device, etc.) an indication of the classification associated with the signature (e.g., an indication whether the traffic is C2 traffic, or an indication whether the traffic is malicious/non-malicious traffic). Security platform 140 may update a mapping of signatures to traffic classifications and provide the updated mapping to the security entity. In some embodiments, security platform 140 further provides to the network node (e.g., security entity, client device, etc.) an indication of a manner in which traffic matching the signature is to be handled. For example, security platform 140 provides to the security entity a traffic handling policy, a security policy, or an update to a policy.

In response to receiving a sample to be analyzed, security platform 140 (e.g., network traffic classifier 170) determines the traffic classification, such as based on querying a classifier based on a header embedding for the header information of the sample. As an example, network traffic classifier 170 determines whether an identifier or representative information corresponding to the sample (e.g., a signature of the sample, an originating IP address) is comprised in the historical information (e.g., a blacklist, a whitelist, etc.). In some embodiments, representative information corresponding to the sample is a hash or signature of the access path (or subset of the access path) for the sample. In some embodiments, representative information corresponding to the sample is a hash or signature of the header information (or header information re-formatted according to the predefined header format) for the sample.

In some embodiments, system 100 (e.g., prediction engine 174 of network traffic classifier, an inline firewall or other inline security entity, etc.) determines whether information pertaining to a particular sample (e.g., a newly received sample to be analyzed) is comprised in a dataset of historical samples (e.g., historical network traffic), whether a particular signature is associated with malicious traffic, or whether traffic corresponding to the sample to be otherwise handled in a manner different than the normal traffic handling. The historical information may be provided by a third-party service such as VirusTotal™. In response to determining that information pertaining to a sample is not comprised in, or available in, the dataset of historical samples, system 100 (e.g., network traffic classifier 170 or other inline security entity) may deem that the sample/traffic has not yet been analyzed and system 100 can invoke an analysis (e.g., a sample analysis) of the sample (e.g., an analysis of the access path for the sample) in connection with determining (e.g., predicting) the traffic classification (e.g., an inline security entity can query a classifier, such as network traffic classifier 170 that uses the header information for the sample to query a machine learning model). The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, routing of traffic, security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

In some embodiments, network traffic classifier 170 provides to a security entity, such as data appliance 102, an indication of the traffic classification. For example, in response to detecting the C2 traffic, network traffic classifier 170 sends an indication that the sample corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the sample, network traffic classifier 170 provides to the security entity an update of a mapping of signatures to applications (e.g., application identifiers).

Figure 2:
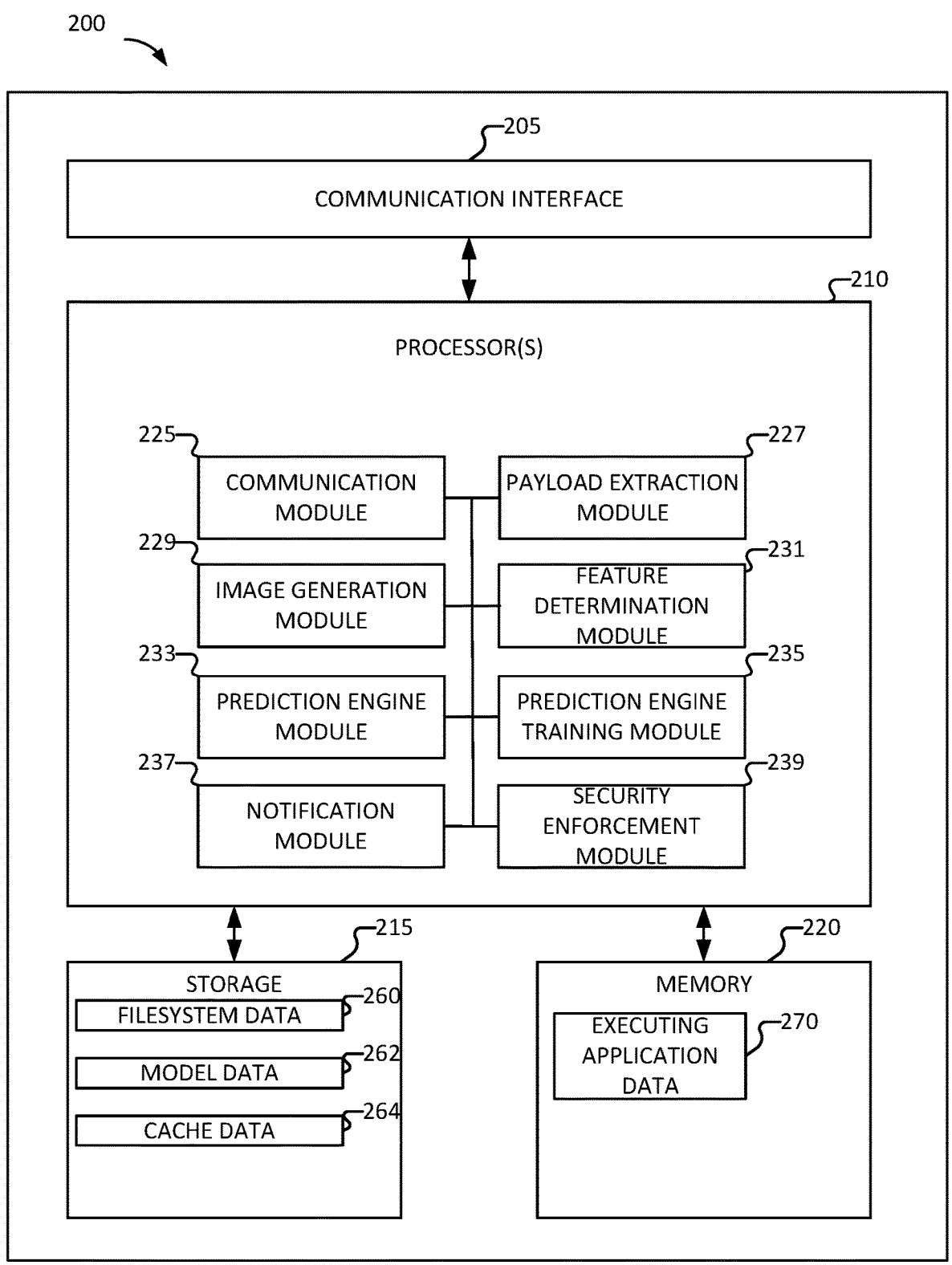
FIG. 2 is a block diagram of system for detecting and handling Command and Control (C2) traffic according to various embodiments.

FIG. 2 is a block diagram of system for detecting and handling Command and Control (C2) traffic according to various embodiments. According to various embodiments, system 200 is implemented in connection with system 100 of FIG. 1, such as for network traffic classifier 170, system 500 of FIG. 5, and/or system 600 of FIG. 6. In various embodiments, system 200 is implemented in connection with process 300 of FIG. 3, process 700 of FIG. 7, process 800 of FIG. 8, process 900 of FIG. 9, process 1000 of FIG. 10, process 1100 of FIG. 11, and/or process 1200 of FIG. 12. System 200 may be implemented in one or more servers, a security entity such as a firewall, and/or an endpoint.

System 200 can be implemented by one or more devices such as servers. System 200 can be implemented at various locations on a network. In some embodiments, system 200 implements network traffic classifier 170 of system 100 of FIG. 1. As an example, system 200 is deployed as a service, such as a web service (e.g., system 200 determines whether traffic corresponding to a particular traffic sample is malicious or C2 traffic, and provides such determinations as a service). The service may be provided by one or more servers. For example, system 200 or network traffic classifier is deployed on a remote server that monitors or receives network traffic that is transmitted within or into/out of a network and determines the traffic classification (e.g., whether the traffic is C2 traffic, whether the traffic is malicious, whether the traffic is non-malicious, etc.) and sends/ pushes out notifications or updates pertaining to the network traffic such as an indication of the application to which the network traffic corresponds or an indication of whether an application is malicious. As another example, the network traffic classifier is deployed on a firewall. In some embodiments, part of system 200 is implemented as a service (e.g., a cloud service provided by one or more remote servers) and another part of system 200 is implemented at a security entity or other network node such as a client device.

In some embodiments, system 200 receives network traffic and predicts a traffic classification (e.g., whether the traffic is C2 traffic, malicious traffic, or non-malicious traffic, etc.). System 200 can perform an active measure (or cause an active measure to be performed) in response to determining the traffic classification. For example, system 200 performs an active measure in response to determining that the traffic is C2 traffic (e.g., detecting C2 traffic). As another example, system 200 handles the traffic according to normal/ benign traffic in response to determining that the traffic is not C2 traffic or is otherwise not malicious traffic.

In the example shown, system 200 implements one or more modules in connection with predicting a traffic classification, determining a likelihood that traffic is C2 traffic or malicious traffic, determining a likelihood that traffic is benign/non-malicious traffic, etc. System 200 comprises communication interface 205, one or more processors 210, storage 215, and/or memory 220. One or more processors 210 comprises one or more of communication module 225, payload extraction module 227, image generation module 229, feature determination module 231, prediction engine module 233, prediction engine training module 235, notification module 237, and security enforcement module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides communication module 225 information received by system 200. Communication module 225 is configured to receive an indication of samples (e.g., HTTP requests, URLs, URIs, network traffic, etc.) to be analyzed, such as from network endpoints or nodes such as security entities (e.g., firewalls), database systems, query systems, etc. Communication module 225 is configured to query third party service(s) for information pertaining to the network traffic classifications (e.g., services that expose information/ classifications for signatures/hashes of network traffic such as third-party scores or assessments of maliciousness of particular traffic, a community-based score, assessment, or reputation pertaining to domains or applications, a blacklist for domains, applications, or certain types/signatures of network traffic such as HTTP requests, and/or a whitelist for domains, applications, or other certain types of network traffic, etc.). For example, system 200 uses communication module 225 to query the third-party service(s). Communication module 225 is further configured to receive one or more settings or configurations from an administrator. Examples of the one or more settings or configurations include configurations of a process determining whether a particular type of traffic (e.g., a particular HTTP request) is permitted, malicious, benign, etc., a format or process according to which a feature vector or embedding is to be determined, a set of feature vectors or embeddings to be provided to a classifier for determining the traffic classification (e.g., for predicting whether traffic is C2 traffic, or predicting whether the traffic is malicious/non-malicious), a set of predefined signatures to be assessed or counted, information pertaining to a whitelist of domains, IP addresses, applications, nodes, or signatures for traffic (e.g., traffic that is not deemed suspicious or malicious), information pertaining to a blacklist of domains, IP addresses, or applications, nodes, or signatures for traffic (e.g., traffic that is deemed to be suspicious or malicious and for which traffic is to be quarantined, deleted, or otherwise to be restricted from being executed/transmitted), etc.

In some embodiments, system 200 comprises payload extraction module 227. System 200 uses payload extraction module 227 to extract payload information from the sample. Payload extraction module 227 may obtain a first packet for an HTTP session and extract the payload information (e.g., the header information) from such first packet. For example, in response to system 200 receiving a sample and/or an indication to analyze a sample, payload extraction module 227 extracts the header information from the sample (e.g., the information for the various HTTP headers in the sample). In response to obtaining the payload information, payload extraction module 227 may decode the payload information to obtain a decoded payload. As an example, payload extraction module 227 uses a base64 coding technique to decode the payload information. Decoding the payload may include analyzing the encoded payload information to determine a type of encoding used, and thereafter decoding the payload information based on the identified type of encoding.

In some embodiments, system 200 comprises image generation module 229. System 200 uses image generation module 229 to generate an image representation of the sample based at least in part on the payload information (e.g., the decoded payload information). Image generation module 229 may generate the image representation based on a predefined protocol or process for generating the image. The predefined protocol may include a predefined dimensionality of the image representation, a shape of the image representation, etc. As an example, image generation module 229 determines a square two-dimensional array/matrix for the payload information. Determining the square two-dimensional array/matrix may include zero padding the two-dimensional array or trimming part of the byte string corresponding to the payload information.

In some embodiments, generating the image representation includes one or more of: (i) obtaining a byte stream corresponding to the payload information (e.g., the first request header in an HTTP session), (ii) resizing the one-dimensional byte stream to obtain a two-dimensional matrix, (iii) padding the two-dimensional matrix with zeros or trimming the byte string to make the two-dimensional matrix perfectly square (e.g., of a predefined dimensionality), and (iv) convert the square two-dimensional matrix to an image (e.g., by performing a byte to grayscale image conversion). The obtaining the byte stream may include decoding the payload information and converting the bytes into their respective ASCII values. Converting the square two-dimensional matrix to an image may include resizing the image data, such as to obtain an image representation having a predefined dimensionality. In some embodiments, the predefined dimensionality is 64×64. However, various other dimensionalities may be implemented, such as 32×32, 128×128, 256×256, etc. Increasing the dimensionality generally increases the latency for the classifier (e.g., the machine learning model) to classify the image. An image representation having a dimensionality of 64×64 was found to enable a classifier having a relatively high detection rate (e.g., a 95% detection rate with a low false positive rate, such as a false positive rate less than 0.5%) and relatively low latency (e.g., a latency of less than 10 milliseconds, or more preferably less than 7 milliseconds). A predefined dimensionality of greater than 128×128 may make classifying samples difficult or ineffective because of the increased latency.

In some embodiments, system 200 comprises feature determination module 231. System 200 uses feature determination module 231 to determine features for the sample. Feature determination module 231 may implement a CNN to obtain the features. For example, the CNN applies a plurality of convolutional filters to the input data. Each filter is convolved with the input (e.g., the image representation) using a sliding window operation. At each position, the filter multiples its weights element-wise with the corresponding input values, and then sums them to produce a single value. The convolutional layers extract features from the input, apply filters, and output a feature map corresponding to the image representation (e.g., a feature map for the network traffic sample being classified). Feature determination module 231 may implement a pooling layer(s) to downsample the convolved features (e.g., the feature maps output from the convolutional layers). Common pooling operations include max pooling, where the maximum value within a window is retained, or average pooling, where the average value is computed. The downsampled feature maps output by the pooling layer(s) may highlight the presence of specific features such as edges, textures, or shapes at different spatial locations of the image representation.

In some embodiments, system 200 comprises prediction engine module 233. System 200 uses prediction engine module 233 to determine a traffic classification, such as to predict whether the sample corresponds to C2 traffic (e.g., traffic corresponding to a particular C2 framework), predict whether the sample corresponds to malicious traffic, and/or predict whether the sample corresponds to benign/non-malicious traffic. Prediction engine module 233 determines the traffic classification based on querying a classifier, such a machine learning model. In some embodiments, the classifier is a CNN model that predicts the traffic classification based on the features. In some embodiments, prediction engine module 233 comprises dense layers (e.g., the fully connected layers) for a CNN.

The purpose of the fully connected layers in a CNN is to perform high-level feature extraction and mapping to the desired output. Before the fully connected layers, the feature maps from the previous layers are typically flattened into a one-dimensional vector. This flattening process converts the multi-dimensional spatial representation into a linear form suitable for the fully connected layers. In image classification, the fully connected layers take the flattened feature vector and learn to classify the input image into specific classes. Each neuron in a fully connected layer is connected to every neuron in the previous layer. For example, the output of each neuron in the previous layer contributes to the input of every neuron in the fully connected layer. Each connection between neurons in the fully connected layers has its own weight, which determines the strength of the connection. Additionally, each neuron in the fully connected layer has a bias term, which allows for the introduction of an offset in the computation. Each neuron in the fully connected layer applies an activation function to the weighted sum of its inputs, typically using functions like ReLU, sigmoid, or softmax. The activation function introduces non-linearities into the network and allows it to learn complex relationships between the features.

According to various embodiments, prediction engine module 233 flattens the outputs of the last convolutional module and passes the flattened outputs through a couple of fully connected layers, while also applying regularization via dropout modules between these layers. Prediction engine module 233 obtains two probabilities from the output layer. The two probabilities correspond to (a) a probability that the sample is malicious, and (b) a probability that the sample is benign.

In some embodiments, prediction engine module 233 queries the classifier and obtains an indication of a likelihood that the sample corresponds to C2 traffic. Prediction engine module 233 may determine that the sample corresponds to C2 traffic in response to determining the likelihood that the sample corresponds to C2 traffic obtained based on querying the classifier exceeds a predefined C2 likelihood threshold.

According to various embodiments, prediction engine module 233 implements a classifier (e.g., a machine learning model) to classify the network traffic (e.g., an obtained sample or record from a network traffic log) based on the features (e.g., the feature maps or feature vector). System 200 may train the classifier, or system 200 may obtain the classifier from a service. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a convolutional neural network (CNN), etc. In some embodiments, system 200 implements a CNN model. The classifier provides a predicted classification (e.g., a machine learning-based predicted classification), such as a prediction of whether the traffic is C2 traffic, a prediction of whether the corresponding traffic (e.g., domain corresponding to the access path) is malicious, or a likelihood that the traffic is malicious (e.g., whether the traffic is exploit traffic).

In some embodiments, system 200 comprises prediction engine training module 235. System 200 uses prediction engine training module 235 to train the machine learning model (e.g., classifier) used to perform traffic classification (e.g., to predict whether a sample corresponds to C2 traffic). Prediction engine training module 235 may train a model that detects C2 traffic across a plurality of C2 frameworks, or a plurality of models that are each trained to detect a respective C2 frameworks.

Training the machine learning model includes optimizing the model such as via optimizing a cost function, such as cost function provided in Equation (1). The cost function may be an entropy-based loss function. Prediction engine training module 235 implements a stochastic gradient descent and back-propagation algorithm to train the machine learning model. The cross-entropy function is used to compute a penalty for misclassification. Prediction engine training module 235 uses back-propagation for updating the weights of neurons in the fully connected layers with the computed penalty. Optimization is performed though a stochastic gradient descent with momentum (e.g., using the Adam algorithm). During experimentation, a batch size of 32 was found to work best to train the classifier.

In some embodiments, prediction engine training module 235 trains the classifier/machine learning model on a training set. Prediction engine training module 235 may iterate over the training set multiple times (e.g., each deemed an epoch). The training process typically involves repeating steps (e.g., forward propagation, loss computation, back-propagation, and parameter update) for multiple epochs until the network has learned the underlying patterns and relationships in the training set. Each epoch allows the network to update its parameters based on the accumulated information from the previous iterations, gradually improving its performance. As an example, prediction engine training module 235 implements 10 epochs in connection with training the classifier. Various other numbers of epochs may be implemented.

During each epoch, prediction engine training module 235 (e.g., the CNN) performs one or more of a forward propagation, a loss computation, a backpropagation, and a parameter update. In the forward propagation step, each training sample is fed forward through the network, starting from the input layer and progressing through the hidden layers until the output layer. The network computes predictions for each input sample. In the loss computation step, predictions made by the network are compared to the actual target values from the training dataset. A loss function, such as mean squared error or cross-entropy loss, measures the discrepancy between the predicted and target values. In the backward propagation step, gradients of the loss with respect to the network's parameters (weights and biases) are computed using the chain rule of calculus. The gradients indicate how each parameter should be adjusted to minimize the loss. In the parameter update step, the network's parameters are updated using an optimization algorithm, such as gradient descent. The gradients obtained during backpropagation are used to update the weights and biases in a direction that reduces the loss.

In some embodiments, system 200 comprises notification module 237. System 200 uses notification module 237 to provide an indication of the traffic classification, such as an indication whether the traffic is malicious, an indication whether the traffic is C2 traffic, an indication of the particular C2 framework to which the traffic corresponds, if any, etc. Notification module 237 provides the indication (e.g., the report) to another system or service, such as inline security or other security entity requesting the traffic classification or otherwise handling the traffic, or an administrator system (e.g., used by a network administrator while evaluating a security policy posture, etc.), etc. Notification module 237 may also provide an indication of an active measure to be implemented or a recommendation for an active measure to be implemented (e.g., a recommendation for handling the traffic based on the traffic classification, etc.).

System 200 may use notification module 237 to provide to one or more security entities (e.g., a firewall), nodes, or endpoints (e.g., a client terminal) an update to a whitelist of traffic, such as a whitelist of IP addresses (e.g., IP addresses from which HTTP requests originate) or a whitelist of traffic signatures (e.g., hashes for samples deemed to be benign). According to various embodiments, notification module 237 obtains a hash, signature, or other unique identifier associated with the domain (e.g., a webpage for the domain) or network traffic, and provides the indication of whether the sample is malicious in connection with the hash, signature, or other unique identifier associated with the sample.

According to various embodiments, the hash of a sample corresponds to a hash of an IP address (e.g., the IP address from which the HTTP request originates), a hash of header information, a hash of header information that is formatted according to a predefined format, etc. A security entity or an endpoint may compute a hash of a sample or traffic monitored/analyzed. The security entity or an endpoint may determine whether the computed hash corresponding to the sample is comprised within a set such as a whitelist of benign traffic, and/or a blacklist of traffic, etc. If a signature for a received sample is included in the set of signatures for samples previously deemed malicious (e.g., a blacklist of samples), the security entity or an endpoint can prevent the transmission of the corresponding traffic or prevent traffic to/from a client device from which C2 traffic was collected.

In some embodiments, system 200 comprises security enforcement module 239. System 200 uses security enforcement module 239 enforces one or more security policies with respect to information such as network traffic, files, etc. System 200 may use security enforcement module 239 to perform an active measure with respect to the network traffic in response to detecting the that the traffic corresponds to C2 traffic. Security enforcement module 239 enforces the one or more security policies based on whether the file is determined to be malicious. As an example, in the case of system 200 being a security entity (e.g., a firewall) or firewall, system 200 comprises security enforcement module 239. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

According to various embodiments, storage 215 comprises one or more of filesystem data 260, model data 262, and/or cache data 264. Storage 215 comprises a shared storage (e.g., a network storage system) and/or database data, and/or user activity data.

In some embodiments, filesystem data 260 comprises a database such as one or more datasets (e.g., one or more datasets for domains, datasets comprising samples of network traffic, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, etc.). Filesystem data 260 comprises data such as historical information pertaining to HTTP request data or network traffic, a whitelist of network traffic profiles (e.g., hashes or signatures for the HTTP request data) or IP addresses deemed to be safe (e.g., not suspicious, benign, etc.), a blacklist of network traffic profiles deemed to be suspicious or malicious, etc.

Model data 262 comprises information pertaining to one or more models used to predict traffic classification, or to predict a likelihood that the network traffic corresponds to a particular type of traffic (e.g., C2 traffic, a particular C2 framework, generally malicious traffic, or non-malicious traffic, etc.). As an example, model data 265 stores the classifier (e.g., a CNN machine learning classifier model(s) such as a detection model) used in connection with a set of features (e.g., feature maps, feature vectors, embeddings, etc.) associated with the payload information (e.g., header information for HTTP request data). Model data 262 comprises a feature vector that may be generated with respect to one or more characteristics of the network traffic.

Cache data 264 comprises information pertaining to a predicted traffic classifications for network traffic, such as predictions of whether the traffic is C2 traffic. For example, cache data 264 stores an indication that the network traffic is C2 traffic, an indication of a likelihood that the network traffic is malicious traffic, an indication of a likelihood that the network traffic is benign/non-malicious traffic, etc.

The information pertaining to a determination can be obtained by notification module 237 and provided in response to the classification (e.g., communicated to the applicable security entity, endpoint, or other system).

In some embodiments, cache data 264 comprises hashes, signatures, or IP addresses for traffic samples (e.g., HTTP requests) that are analyzed by system 200 to determine whether the traffic samples correspond to malicious traffic (e.g., C2 traffic), or a historical dataset that has been previously assessed to determine whether the traffic samples are malicious, such as historical determinations provided by a third party. Cache data 264 can include a mapping of hash values or other identifiers associated with network traffic (e.g., access paths) to indications of the traffic classifications.

According to various embodiments, memory 220 comprises executing application data 270. Executing application data 270 comprises data obtained or used in connection with executing an application such as an application executing a hashing function, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3:
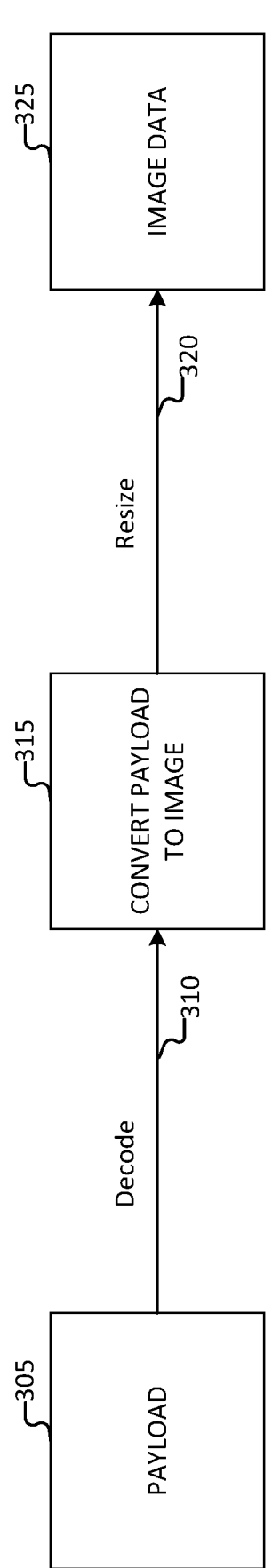
FIG. 3 is a system for processing the payload to obtain an input for a classifier according to various embodiments.

FIG. 3 is a method for processing the payload to obtain an input for a classifier according to various embodiments. In some embodiments, process 300 is implemented by system 100 of FIG. 1 or system 200 of FIG. 2, such as in connection with obtaining the image representation of a network traffic sample. In the example shown, the system obtains a payload at 305. The system obtains the payload from a packet in the HTTP session, such as the first packet in the HTTP session. As an example, the payload corresponds to header information for the HTTP request. In response to obtaining the payload, at 310, the system decodes the payload to obtain a decoded payload. The system decodes the payload based on the type of encoding used to encode the packet (e.g., a base64 encoding). After decoding the payload, at 315, system converts the payload to an image.

In some embodiments, converting the payload to an image includes one or more of: (i) obtaining a byte stream corresponding to the payload information (e.g., the first request header in an HTTP session), (ii) resizing the one-dimensional byte stream to obtain a two-dimensional matrix, (iii) padding the two-dimensional matrix with zeros or trimming the byte string to make the two-dimensional matrix perfectly square (e.g., of a predefined dimensionality), and (iv) convert the square two-dimensional matrix to an image (e.g., by performing a byte to grayscale image conversion).

In response to converting the payload to an image (e.g., by performing a byte to grayscale image conversion), at 320, the system resizes the image to a predefined image size (e.g., a predefined dimensionality). As an example, the image is resized to be 64×64. Resizing the image may include performing an upsampling of the image to increase the size or resolution for the image. Various upsampling techniques may be implemented. The most common upsampling technique is known as interpolation. Interpolation algorithms estimate the values of the new data points based on the existing ones. The simplest interpolation method is called "nearest-neighbor," where each new sample is assigned the value of the nearest existing sample. Other commonly used interpolation methods include bilinear interpolation, bicubic interpolation, and Lanczos interpolation, which offer higher-quality results by considering neighboring samples in the estimation process.

At 325, the system obtains the image data (e.g., an image representation based on the resizing of the image). The system may query the classifier based on the image data to obtain a predicted classification for the network traffic.

FIG. 4A is an example payload obtained from a first packet of a session for network traffic according to various embodiments. In the example shown, the system obtains payload 400 from an HTTP request, such as a first packet in an HTTP session. Payload 400 may comprise header information 405. The system may use header information 405 to determine whether the network traffic associated with the session is malicious (e.g., to detect whether the traffic corresponds to a particular C2 framework). For example, the system generates an image representation based on converting header information 405 to an image representation, and querying a classifier (e.g., a CNN model) to predict a traffic classification based on the image representation.

FIG. 4B is an example of a sample header to be used in connection with detecting C2 traffic according to various embodiments. In the example shown, the system obtains payload 425 from an HTTP request, such as a first packet in an HTTP session. Payload 425 may comprise header information 430. Payload 425 is an example of a Cobalt Strike beacon.

FIG. 4C is an example of a sample header that is processed according to various embodiments. In response to obtaining payload 425, in connection with training the classifier, the system processes payload 425 to obtain payload 450. For example, the system uses payload 425 to upsample the training set by augmenting the HTTP payloads in the training set. The processing of payload 425 includes randomly re-ordering the fields and values to correspond to a predefined.

Figure 5A:
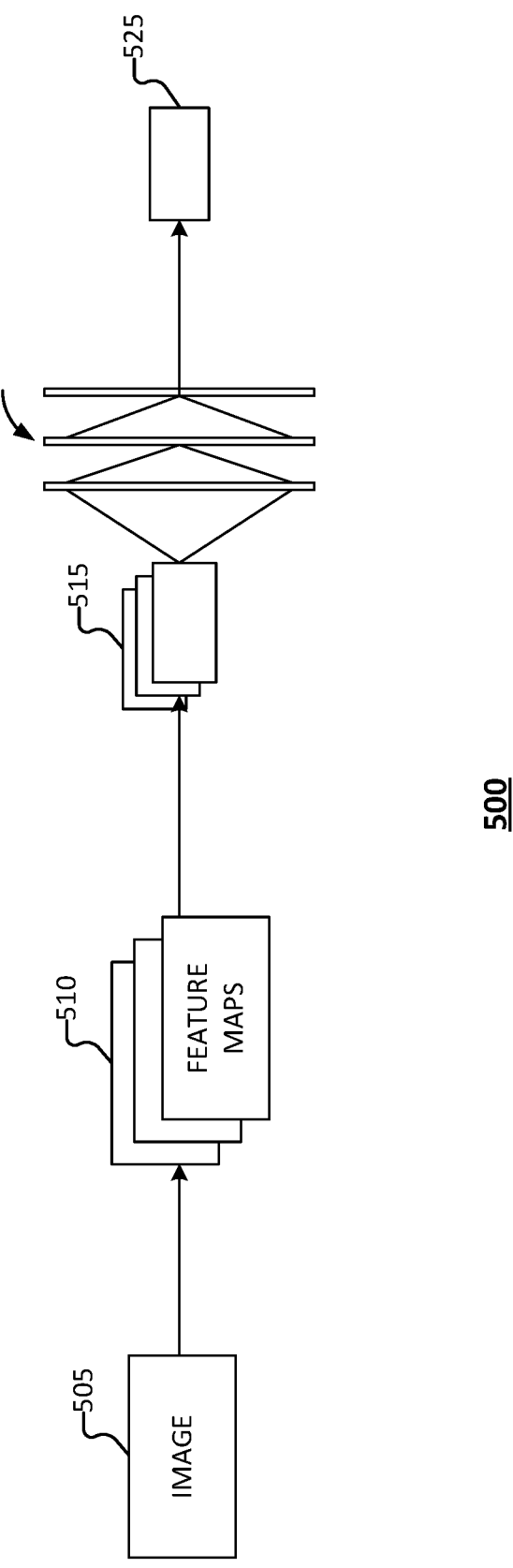
FIG. 5A is a block diagram of system for detecting C2 traffic according to various embodiments.

FIG. 5A is a block diagram of system for detecting C2 traffic according to various embodiments. In some embodiments, system 500 is implemented in connection with system 100 of FIG. 1, system 200 of FIG. 2, system 600 of FIG. 6, process 700 of FIG. 7, process 800 of FIG. 8, process 900 of FIG. 9, process 1000 of FIG. 10, process 1100 of FIG. 11, and/or process 1200 of FIG. 12.

In the example shown, system 500 comprises input module 505, convolutional layers 510, pooling layers 515, fully connected layers 520, and output module 525.

Input module 505 processes the sample to be analyzed. For example, input module 505 processes the sample to obtain an image representation of the payload (e.g., a grayscale representation of the header information). Processing the sample includes decoding the payload, extracting header information, obtaining a byte stream for the header information, converting the byte stream to a square two-dimensional array, and generating an image representation (e.g., a grayscale image for the two-dimensional array).

Convolutional layers 510 perform convolution operations on the input data (e.g., the image data corresponding to the traffic sample) using learnable filters (also known as kernels or feature detectors). These filters extract local features from the input, such as edges, corners, or textures, by convolving them with the input data. Each filter generates a feature map that represents the presence of a particular feature in the input.

The output from convolutional layers 510 is then input to pooling layers 515. Pooling layers 515 are used to down sample the feature maps produced by convolutional layers 510. Pooling layers 515 reduce the spatial dimensions of the data while retaining the most salient information. In some embodiments, pooling layers 515 implements a max pooling, according to which the maximum value within a pooling window is selected as the representative value for that region. Pooling helps to reduce the computational complexity of the network and makes the model more robust to translations and variations in the input.

System 500 may further implement activation functions to further process the image data. Activation functions introduce non-linearity into the network, enabling the system to learn complex relationships between features. Common activation functions used in CNNs include Rectified Linear Unit (ReLU), which sets negative values to zero and keeps positive values unchanged, and variants like Leaky ReLU and Parametric ReLU.

The processed data representing the image data or traffic sample is then input to fully connected layers 520. Fully connected layers, also known as dense layers, are responsible for making the final classification or regression decisions based on the high-level features extracted by the preceding layers. The neurons in these layers are connected to all neurons in the previous layer, allowing for the learning of complex combinations of features. The output of the last fully connected layer is typically fed into an activation function, such as softmax for classification or linear activation for regression, to produce the final output.

The final output from fully connected layers 520 is input to output module 525 that assigns label for traffic classification. For example, if the output from fully connected layers 520 is 0, output module 525 may label the traffic sample of benign. Conversely, if the output from fully connected layers 520 is 1, output module 525 may label the traffic sample as C2 traffic.

Figure 5B:
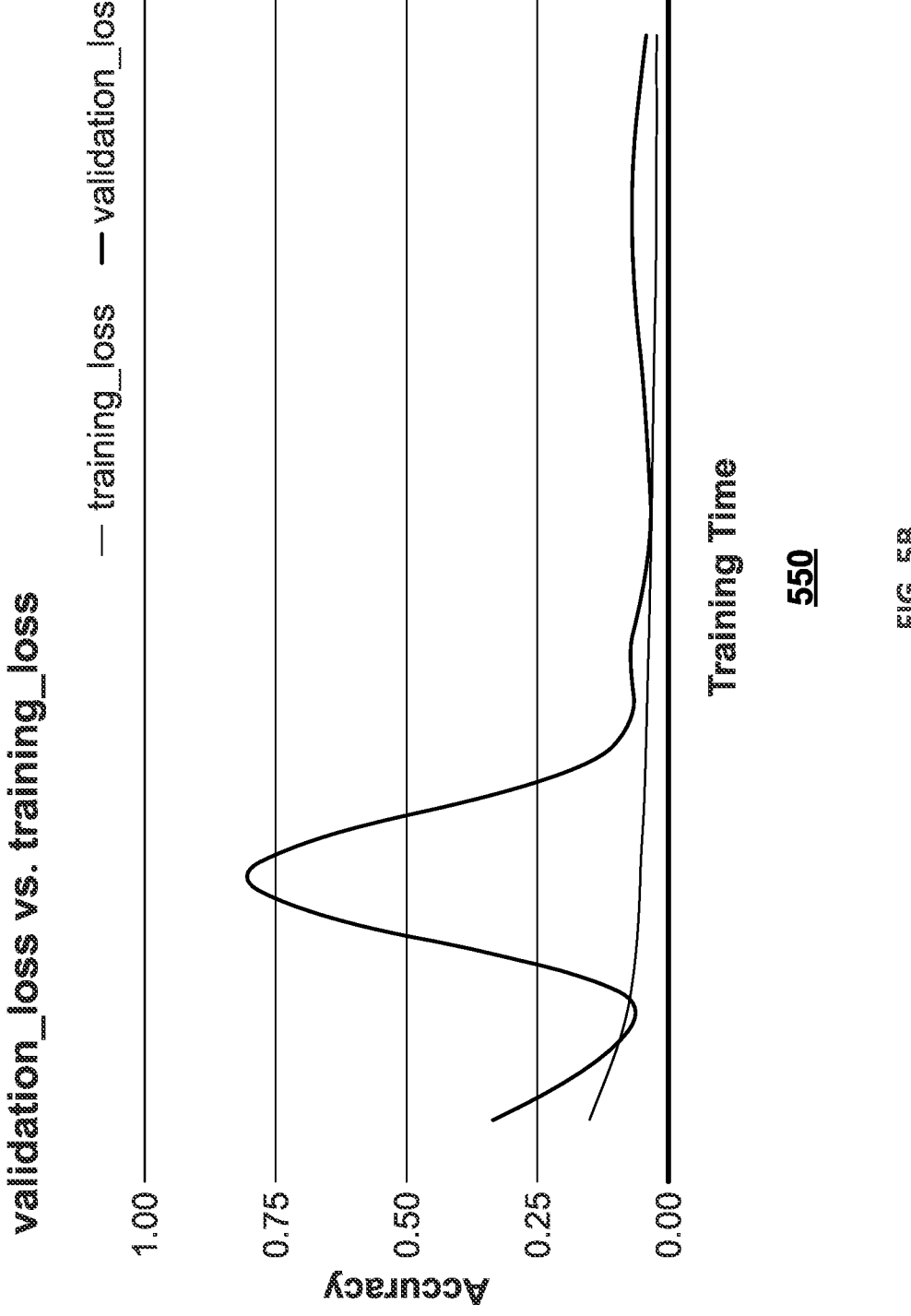
FIG. 5B is a chart illustrating the convergence of a loss during training of a classifier according to various embodiments.
Figure 5C:
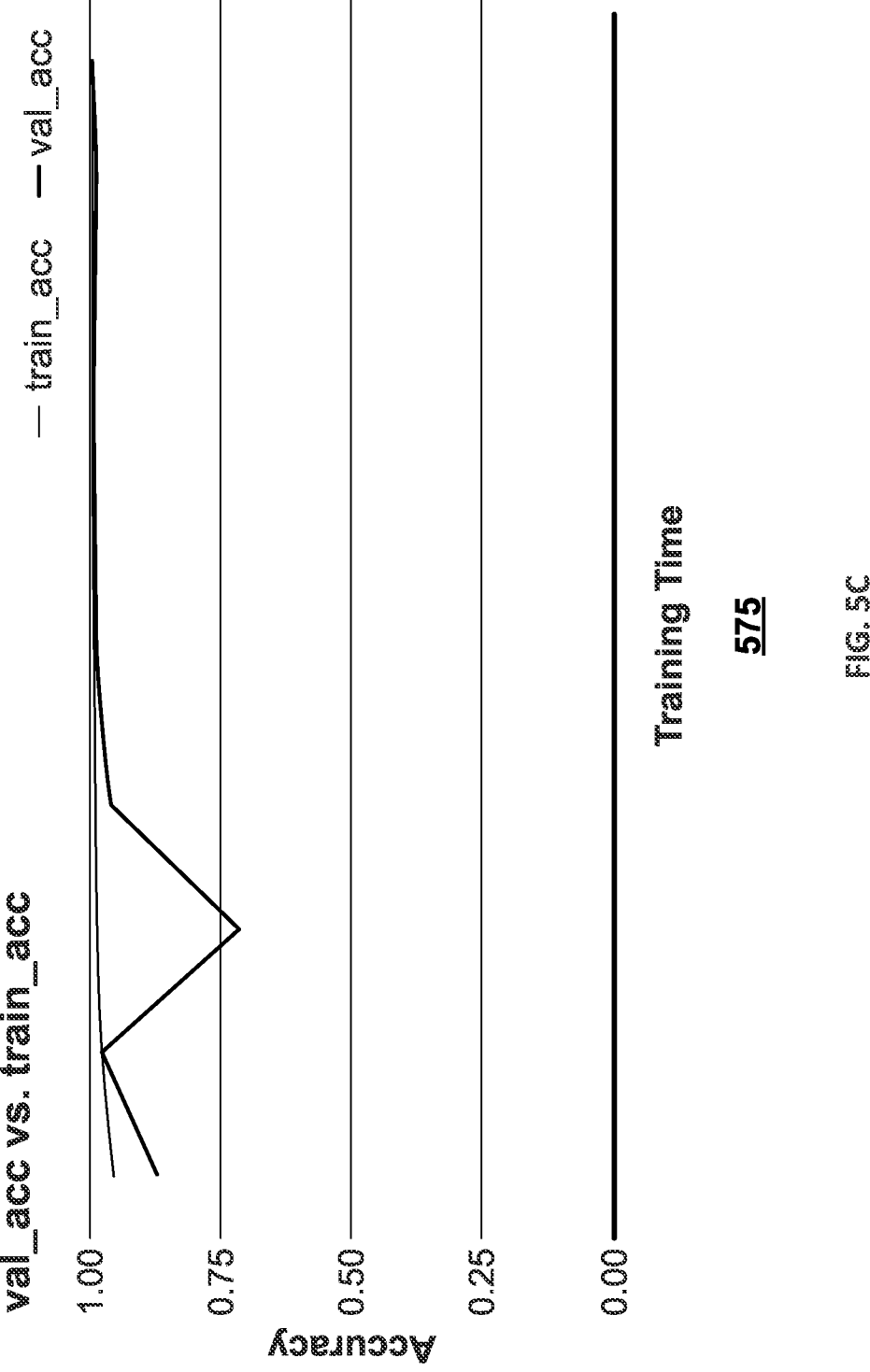
FIG. 5C is a chart illustrating convergence of an accuracy of a classifier during training of the classifier according to various embodiments.

FIG. 5B is a chart illustrating the convergence of a loss during training of a classifier according to various embodiments. FIG. 5C is a chart illustrating convergence of an accuracy of a classifier during training of the classifier according to various embodiments.

In the example shown in FIG. 5B, chart 550 illustrates a validation loss versus training loss of the classifier (e.g., the machine learning model, such as a CNN) during training. As illustrated, the validation loss and the training loss converge over time (e.g., as further epochs are processed). The system implements a cost function, such as the cost function of Equation (1), and uses a stochastic gradient descent and back-propagation.

In the example shown in FIG. 5C, chart 575 illustrates the validation accuracy versus the training accuracy over training time or epochs processed. As illustrated, the validation accuracy initially is less than the training accuracy, and as training progresses, the training accuracy and the validation accuracy converge.

Figure 6:
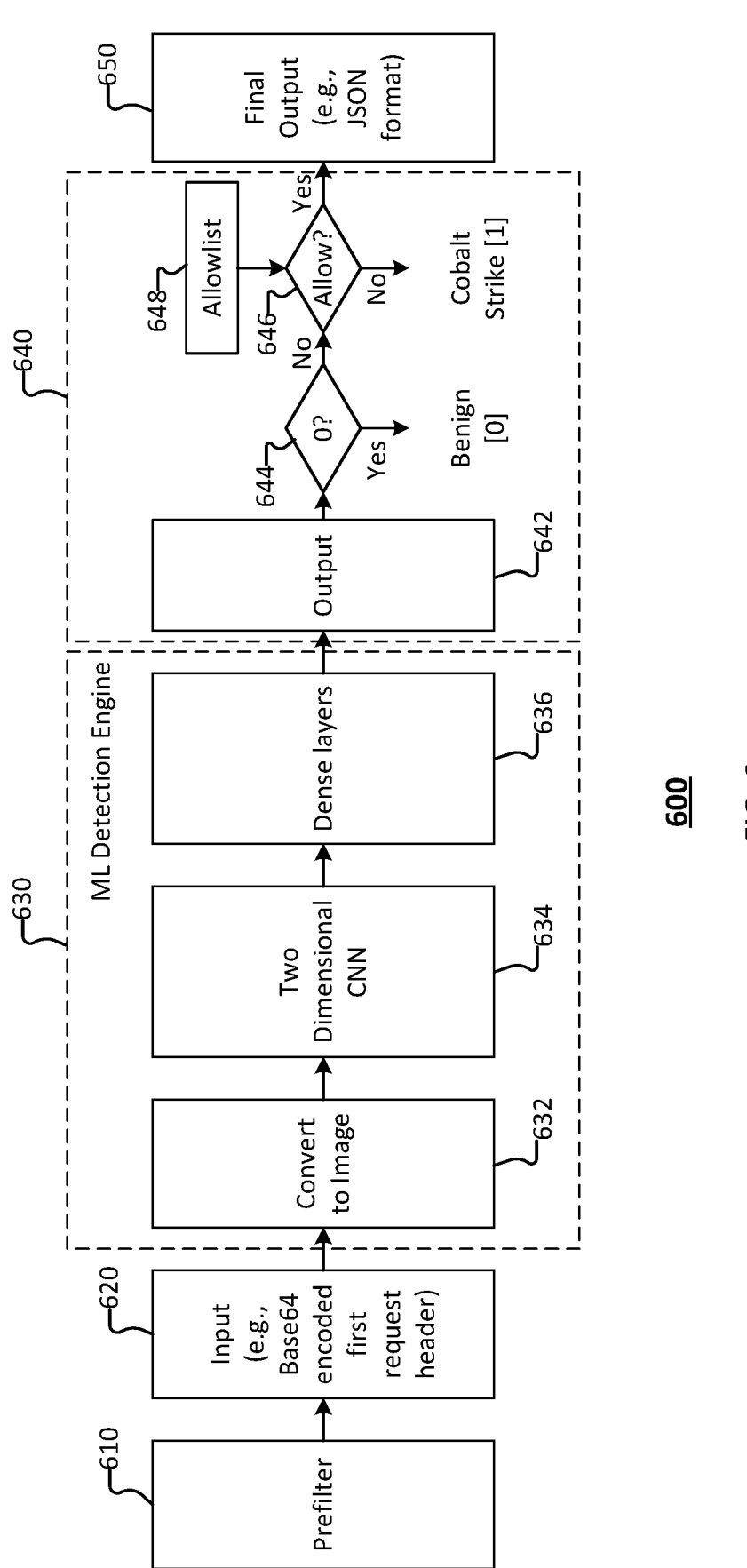
FIG. 6 is a block diagram of a system for detecting C2 traffic according to various embodiments.

FIG. 6 is a block diagram of a system for detecting C2 traffic according to various embodiments. In some embodiments, system 600 is implemented at least in part by system 100 of FIG. 1 (e.g., by network traffic classifier 170) and/or system 200 of FIG. 2. System 600 is implemented in connection with performing a traffic classification.

In the example illustrated, system 600 comprises prefilter 610, input module 620, machine learning detection engine 630, classifier 640, and result module 650. Prefilter 610 obtains a traffic sample, such as a first packet of an HTTP session (e.g., a payload for an HTTP request). Prefilter 610 prefilters the packet to obtain a payload. Input module 620 obtains the payload and decodes the payload. For example, input module 620 decodes the payload using a base64 to obtain the header information (e.g., the first request header).

Machine learning detection engine 630 comprises conversion module 622, CNN 634, and dense layers 636.

Conversion module 632 converts the output from input module 620 (e.g., the decoded payload) to an image. The image may be generated by obtaining a byte string for the payload (e.g., the one-dimensional byte string for the decoded header information), converting the byte string to a square two-dimensional byte array, and converting the two-dimensional byte array to an image (e.g., to a grayscale image representation). Conversion module 632 may additionally resize the image to a predefined image size (e.g., a size for the CNN to classify, such as 64×64).

CNN 634 obtains the image (e.g., the grayscale image representation) from conversion module 632. In response to obtaining the image, CNN 634 applies a plurality of convolutional filters to the input data (e.g., the image). The convolutional layers extract features from the input, apply filters, and output a feature map corresponding to the image representation (e.g., a feature map for the network traffic sample being classified). CNN 634 may implement a pooling layer(s) to downsample the convolved features (e.g., the feature maps output from the convolutional layers).

The output from the convolutional layers and/or pooling layers of CNN 634 are processed by dense layers 636. Dense layers 636 perform high-level feature extraction and mapping to the desired output. Before the fully connected layers, the feature maps from the previous layers are typically flattened into a one-dimensional vector. This flattening process converts the multi-dimensional spatial representation into a linear form suitable for the fully connected layers. In image classification, the fully connected layers take the flattened feature vector and learn to classify the input image into specific classes. Dense layers 636 may also flatten the outputs of the last convolutional module and passes the flattened outputs through a couple of fully connected layers, while also applying regularization via dropout modules between these layers Classifier 640 comprises an output module 642, benign traffic determining module 644, malicious traffic determining module 646, and allowlist 648.

Output module 642 obtains a CNN output from machine learning detection engine 630 (e.g., from dense layer 636). Output module may obtain probabilities from the output layer. The two probabilities correspond to (a) a probability that the sample is malicious, and (b) a probability that the sample is benign. Output module 642 uses the probabilities to determine a result of the CNN. For example, output module 642 uses the probabilities to determine whether to output 0 (e.g., an indication that the sample is benign) or 1 (e.g., an indication that the sample is malicious). Output module 642 may determine the output based on comparing one or more of the probabilities output by machine learning detection engine 630 to one or more predefined thresholds. As an illustrative example, output module 642 compares the probability that the traffic is benign to a predefined benign traffic threshold and in response to determining that the probability exceeds the predefined benign traffic threshold, output module 642 determines that the sample is benign and to output a 0. Predefined benign traffic threshold may be configurable and various threshold values may be implemented based on desired classifier sensitivity. As another illustrative example, output module 642 compares the probability that the traffic is malicious to a predefined malicious traffic threshold and in response to determining that the probability is less than the predefined malicious traffic threshold, output module 642 determines that the sample is not malicious (e.g., that the sample is benign) and outputs 0.

Benign traffic determining module 644 obtains the output from output module 642 and determines whether the output is 0 or otherwise indicates that the sample is benign. In response to determining that the output is 0 or an indication that the sample is benign, benign traffic determining module 644 outputs a result that the sample is benign. Conversely, in response to determining that the output is 1 or an indication that the sample is malicious or not benign, the output is used by malicious traffic determining module 646 to determine whether the sample is malicious.

Malicious traffic determining module 646 obtains (e.g., determines) a hash or signature for the sample or another identifier for the sample, such as the IP address, and queries allowlist 648 to determine whether the hash, signal, or identifier is comprised in a whitelist (e.g., an indication that the sample was previously deemed benign) or blacklist (e.g., an indication that the sample was previously deemed malicious). In response to determining that the sample was previously analyzed and is comprised in allowlist 648, malicious traffic determining module 646 outputs a corresponding result. Otherwise, if allowlist 648 is determined to not comprise a result for the sample, then malicious traffic determining module 646 uses the output from benign traffic determining module 644/output module 642 and outputs an indication that the sample is malicious.

Result module 650 obtains the result from classifier 640, such as an indication that the sample is benign or an indication that the sample is C2 traffic (e.g., a particular type of C2 framework). Result module 650 processes the output, such as by formatting the result. As an example, result module 650 formats the result (e.g., the predicted traffic classification) into JSON format.

FIG. 7 is a flow diagram of a method for detecting malicious traffic according to various embodiments. In some embodiments, process 700 is implemented at least in part by system 100 of FIG. 1, system 200 of FIG. 2, system 500 of FIG. 5, and/or system 600 of FIG. 6. In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment.

At 705, a monitored traffic sample is converted to an image representation for the traffic sample. The system obtains the traffic sample and generates the image representation of the payload for the first packet in the session. In some implementations, the traffic sample is a first packet of an HTTP session that is extracted from a traffic flow (e.g., by an inline security entity, or a cloud service). The system extracts the header information from the payload and uses the header information to obtain the image representation. For example, the system decodes the payload, obtains a one-dimensional byte string corresponding to the header information, converts the one-dimensional byte string to a two-dimensional byte array (e.g., a square two-dimensional byte array based on zero padding or trimming, as necessary), and converts the two-dimensional byte array to a grayscale image. The system may resize the grayscale image to a predefined size to obtain the image representation to be used to predict a traffic classification for the traffic sample.

At 710, a classifier is queried based at least in part on the image representation to obtain a traffic classification. In some embodiments, the classifier is a CNN model. The classifier predicts a classification for the network traffic (e.g., a traffic classification). As an example, the system generates a feature map for the network traffic sample based at least on the image representation. In response to obtaining the feature map, the system queries the classifier, and the classifier (e.g., a machine learning model) uses the feature map to predict the traffic classification.

At 715, C2 traffic is automatically detected based at least in part on the traffic classification. The system obtains an output/result from the classifier. As an example, in response to obtaining the output/result, the system performs a classification labelling to label the network traffic. As an example, in the event that the output is a likelihood that the traffic is C2 traffic, the classification labelling may include comparing the result to a threshold (e.g., a predefined C2 likelihood threshold) and in response to determining that the result exceeds the threshold, labelling the traffic as C2 traffic, and in response to determining that the result is less than the threshold, labelling the traffic as non-C2 traffic, such as benign traffic.

At 720, the network traffic is handled based at least in part on the traffic classification. In response to determining the traffic classification (e.g., performing the classification labelling), the system handles the network traffic accordingly. For example, if the network traffic is classified as C2 traffic, the system handles the network traffic as C2 traffic. As another example, if the network traffic is classified as benign traffic, the system handles the network traffic as benign. In some embodiments, the system handles the network traffic based at least in part on (i) the traffic classification, and (ii) a security policy. For example, a security policy may define how the system is to handle C2 traffic (e.g., block the traffic, etc.).

At 725, a determination is made as to whether process 700 is complete. In some embodiments, process 700 is determined to be complete in response to a determination that no further samples are to be processed, no further image representations are to be processed, no further samples are to be analyzed (e.g., no further predictions for traffic are needed), an administrator indicates that process 700 is to be paused or stopped, etc. In response to a determination that process 700 is complete, process 700 ends. In response to a determination that process 700 is not complete, process 700 returns to 705.

Figure 8:
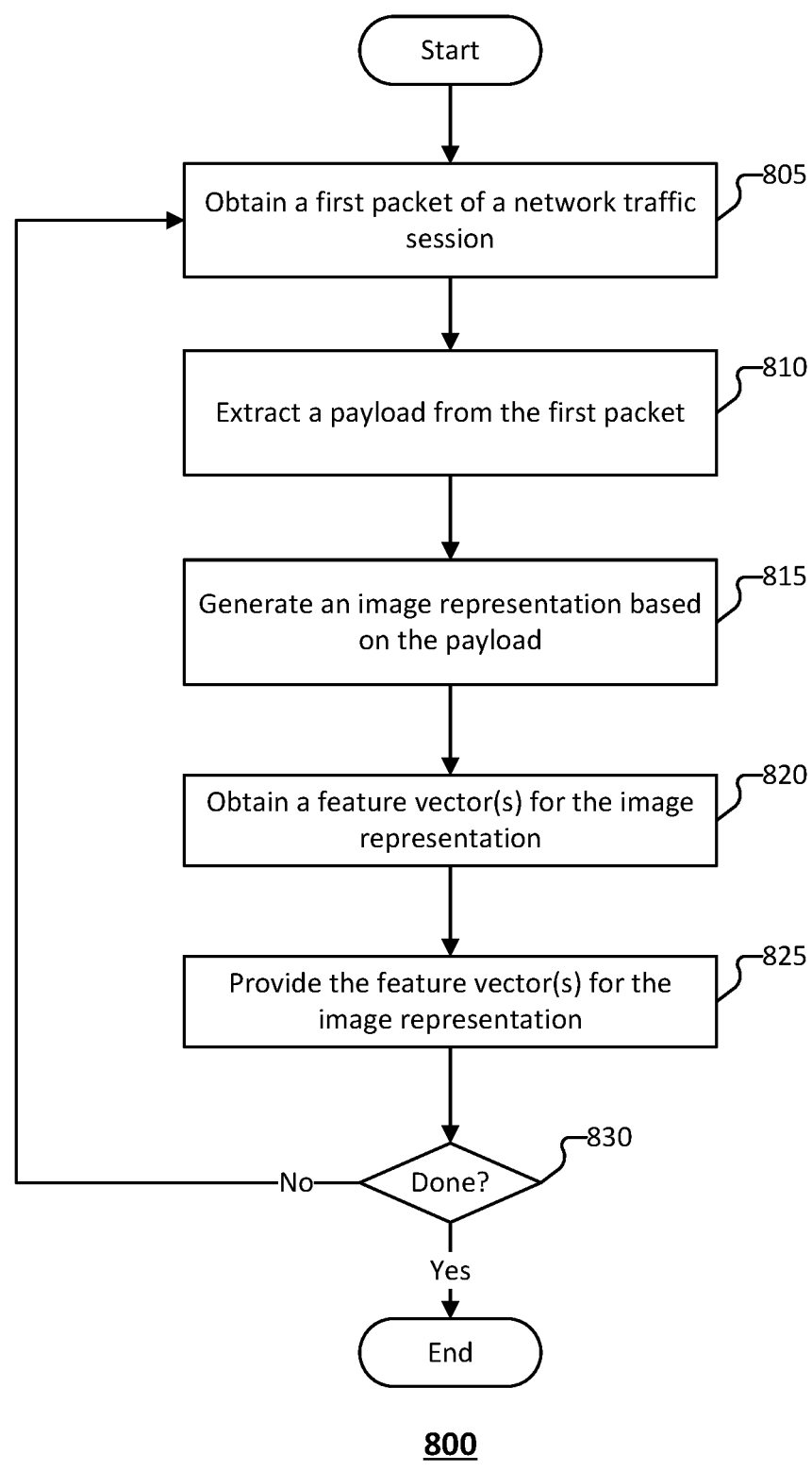
FIG. 8 is a flow diagram of a method for processing header information for detection of malicious samples according to various embodiments.

FIG. 8 is a flow diagram of a method for processing header information for detection of malicious samples according to various embodiments. In some embodiments, process 800 is implemented at least in part by system 100 of FIG. 1, system 200 of FIG. 2, system 500 of FIG. 5A, and/or system 600 of FIG. 6. Process 800 may be invoked by 705 of process 700.

At 805, a first packet of a network traffic session is obtained. The system obtains the first packet of an HTTP session while monitoring traffic flow and performing a security service. At 810, a payload is extracted from the first packet. The payload may comprise header information for the HTTP session. At 815, an image representation is generated based on the payload. As an example, the system implements process 300 of FIG. 3 to generate the image representation for the sample. At 820, a feature vector(s) is obtained for the image representation. For example, the system implements convolutional layers and/or pooling layers to obtain a feature map for the image representation. At 825, the feature vector(s) for the image representation are provided, such as to the system or service that invoked process 800.

At 830, a determination is made as to whether process 800 is complete. In some embodiments, process 800 is determined to be complete in response to a determination that no further samples are to be processed, no further image representations are to be processed, no further samples are to be analyzed (e.g., no further predictions for traffic are needed), an administrator indicates that process 800 is to be paused or stopped, etc. In response to a determination that process 800 is complete, process 800 ends. In response to a determination that process 800 is not complete, process 800 returns to 805.

Figure 9:
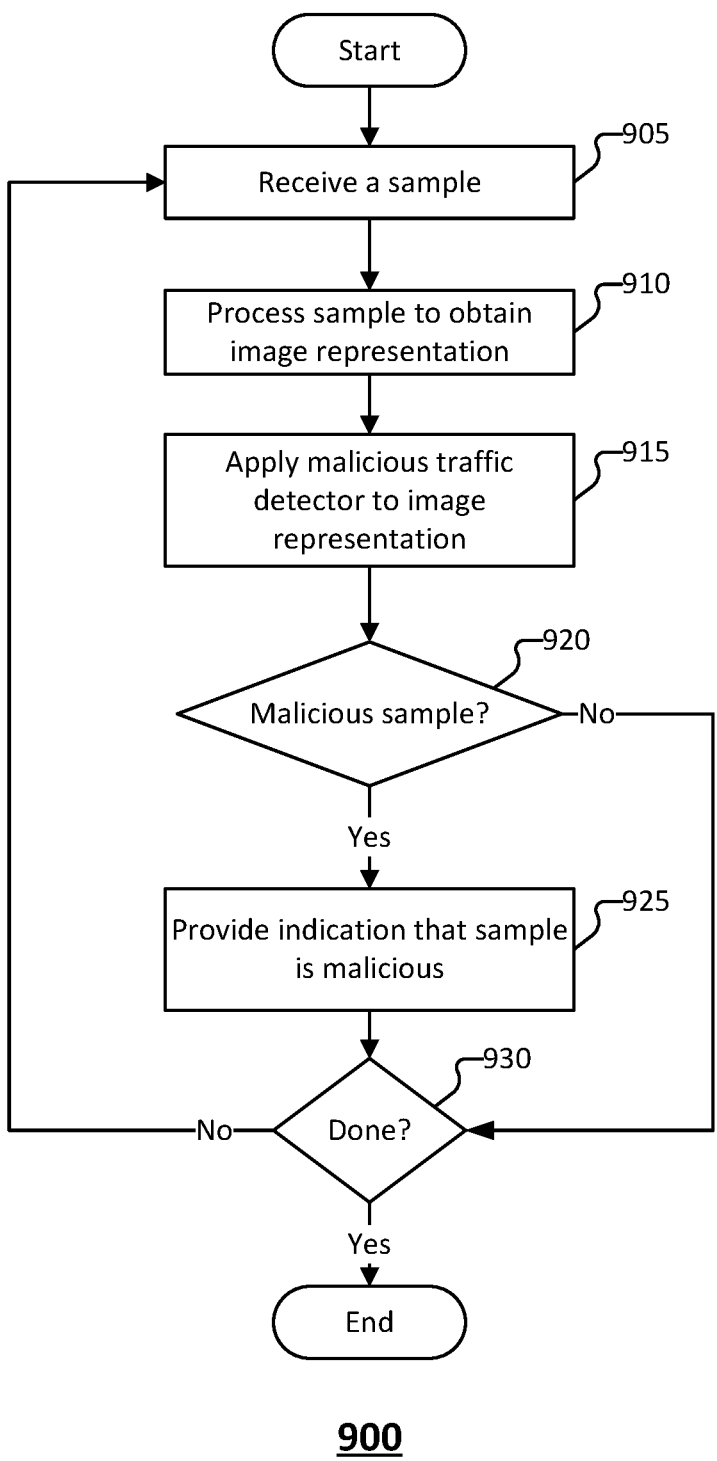
FIG. 9 is a flow diagram of a method for detecting malicious traffic according to various embodiments.

FIG. 9 is a flow diagram of a method for detecting malicious traffic according to various embodiments. In some embodiments, process 900 is implemented at least in part by system 100 of FIG. 1, system 200 of FIG. 2, system 500 of FIG. 5A, and/or system 600 of FIG. 6. In some implementations, process 900 may be implemented by one or more servers, such as in connection with providing a service to a network (e.g., a security entity and/or a network endpoint such as a client device). In some implementations, process 900 may be implemented by a security entity (e.g., a firewall) such as in connection with enforcing a security policy with respect to files communicated across a network or in/out of the network. In some implementations, process 900 may be implemented by a client device such as a laptop, a smartphone, a personal computer, etc., such as in connection with executing or opening a file such as an email attachment.

At 905, a sample is received. In some embodiments, the system receives a sample from a security entity (e.g., a firewall), an endpoint (e.g., a client device), etc. For example, in response to receiving network traffic, the security entity or endpoint extracts a traffic sample (e.g., a first packet for an HTTP request, etc.), and the security entity or endpoint provides (e.g., sends) the traffic sample to the system. The sample may be received in connection with a request to determine whether the traffic sample is malicious. For example, the security entity queries the system for a determination of whether the traffic sample is malicious (e.g., for detection of C2 traffic, etc.).

In the case that process 900 is implemented by a security entity, the sample may be received such as in connection with routing traffic to an applicable network endpoint (e.g., a firewall obtains the sample as traffic is communicated across the firewall). In the case that process 900 is implemented by a client device, the sample may be received by an application or layer monitoring incoming/outgoing information. For example, a process (e.g., an application, an operating system process, etc.) may run in the background to monitor and obtain HTTP requests being generated, transmitted, etc.

At 910, the sample is processed to obtain the image representation. As an example, the image representation is an image that is generated based on the payload in a traffic sample, such as header information from a first packet in an HTTP session. The header information may be pre-processed to obtain a normalized header (e.g., a header that is converted according to a predefined header format, etc.). After the payload is processed to obtain the image representation, the system determines a feature vector(s) or feature map(s).

At 915, a malicious traffic detector is applied to analyze the sample. In some embodiments, the malicious traffic detector correspond to, or is similar to, a machine learning (e.g., ML model 176), prediction engine module 233, system 600, etc. The malicious traffic detector may implement a machine learning process to analyze the sample (e.g., the embeddings for the sample, such as header embeddings) corresponding to the sample. The machine learning process may determine whether the sample is malicious (or a likelihood that the sample is malicious) based at least in part on the feature vector(s) or feature map(s).

Various embodiments use a machine learning model to detect malicious traffic based at least in part on the payload (e.g., header information) comprised in the traffic samples, such as header information in HTTP requests (e.g., first packets in an HTTP session). As an example, the image classification model can be a machine learning or deep learning model that learns from the characters, tokens or terms in the headers of malicious and/or benign traffic.

At 920, a determination of whether the sample is malicious is performed. In some embodiments, the system determines whether the sample is malicious based at least in part on the analysis of the sample using the malicious traffic detector. If the output from the malicious traffic detector is an indication of a likelihood that the sample is malicious traffic (e.g., C2 traffic, a particular type of C2 framework traffic, etc.), the system compares the likelihood to a predefined maliciousness likelihood threshold (e.g., a C2 likelihood threshold) to determine whether the sample is classified as malicious traffic (e.g., C2 traffic).

In some embodiments, in response to malicious traffic detector determining that the sample is malicious, or in response to a likelihood generated by malicious traffic detector that the sample is malicious exceeding a predefined likelihood threshold, the system deems sample to be malicious.

In response to a determination that the sample is malicious at 920, process 900 proceeds to 925 at which an indication that the sample is malicious is provided. For example, the indication that the sample is malicious may be provided to the component (e.g., a system or service) from which the sample is received. As an example, the system provides the indication that the sample is malicious to a security entity. As another example, the system provides the indication that the sample is malicious to a client device. In some embodiments, the indication that the sample is malicious is provided to a user such as a user of a client device and/or a network administrator.

According to various embodiments, in response to receiving the indication that the sample is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the traffic sample, such as a hash of the normalized header information, to an indication that the traffic sample is malicious), etc.

In response to a determination that the sample is not malicious at 920, process 900 proceeds to 930. In some embodiments, in response to determining that the sample is not malicious, a mapping of samples (or hashes/signatures of header information, such as hashes for HTTP request headers) to an indication that the sample is not malicious (e.g., a mapping of samples to indications that the sample is benign) is updated. For example, a whitelist of benign samples is updated to include the sample, or hash, signature, or other unique identifier associated with the sample.

At 930, a determination is made as to whether process 900 is complete. In some embodiments, process 900 is determined to be complete in response to a determination that no further samples are to be analyzed (e.g., no further predictions for traffic are needed), an administrator indicates that process 900 is to be paused or stopped, etc. In response to a determination that process 900 is complete, process 900 ends. In response to a determination that process 900 is not complete, process 900 returns to 905.

Figure 10:
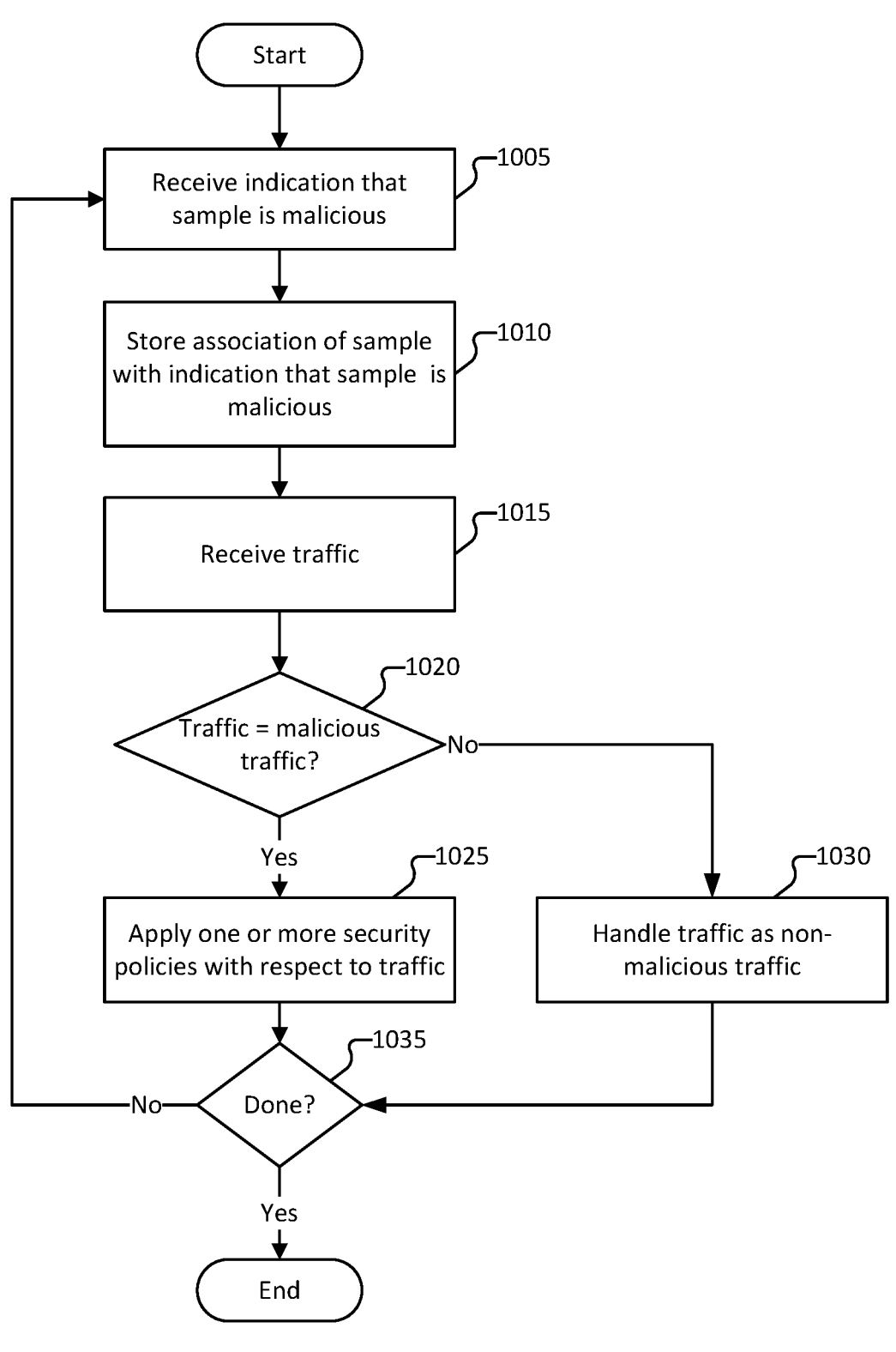
FIG. 10 is a flow diagram of a method for handling traffic according to various embodiments.

FIG. 10 is a flow diagram of a method for handling traffic according to various embodiments. In some embodiments, process 1000 is implemented at least in part by system 100 of FIG. 1, system 200 of FIG. 2, system 500 of FIG. 5A, and/or system 600 of FIG. 6. In some implementations, process 1000 may be implemented by one or more servers, such as in connection with providing a service to a network (e.g., a security entity and/or a network endpoint such as a client device). In some implementations, process 1000 may be implemented by a security entity (e.g., a firewall) such as in connection with enforcing a security policy with respect to files communicated across a network or in/out of the network. In some implementations, process 1000 may be implemented by a client device such as a laptop, a smartphone, a personal computer, etc., such as in connection with executing or opening a file such as an email attachment, or sending HTTP requests across a network.

At 1005, an indication that the sample is malicious is received. In some embodiments, the system receives an indication that a sample is malicious, and the sample or hash, signature, or other unique identifier associated with the sample. For example, the system may receive the indication that the sample is malicious from a service such as a security or malware service. The system may receive the indication that the sample is malicious from one or more servers, such as a cloud service that provides near real-time traffic detection (e.g., a detection latency from the cloud service may be on the order of 5-50 milliseconds). In some embodiments, a classifier described herein is able to classify (e.g., generate a prediction) in less than 10 milliseconds, and preferably less than 7 milliseconds.

According to various embodiments, the indication that the sample is malicious is received in connection with an update to a set of previously identified malicious samples (e.g., headers or normalized headers for HTTP requests). For example, the system receives the indication that the sample is malicious as an update to a blacklist of malicious samples.

At 1010, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received traffic is malicious. In some embodiments, the identifier corresponding to the sample stored in association with the indication that the sample is malicious comprises a hash of the payload (e.g., a header of an HTTP request), a signature of the payload (.g., a header of an HTTP request), an IP address associated with the device from which the HTTP request originated, or another unique identifier associated with the header or normalized header.

At 1015, traffic is received. The system may obtain traffic such as in connection with routing traffic within/across a network, or mediating traffic into/out of a network such as a firewall, or a monitoring of email traffic or instant message traffic.

At 1020, a determination of whether the traffic includes a malicious traffic is performed. For example, the system detects whether the traffic is C2 traffic, or a particular type of C2 framework. In some embodiments, the system obtains the traffic sample (e.g., an HTTP request or header for the HTTP request) from the received traffic. In response to obtaining the traffic sample from the traffic, the system determines whether the traffic sample corresponds to a sample comprised in a set of previously identified malicious samples such as a blacklist of malicious samples (e.g., a blacklist of hashes/signatures for the payloads or headers in first packets of HTTP sessions, a blacklist of IP addresses from which malicious samples have been received, etc.). In response to determining that the traffic sample is comprised in the set of samples on the blacklist of malicious samples, the system determines that the sample is malicious.

In some embodiments, the system determines whether the traffic sample corresponds to a sample comprised in a set of previously identified benign samples such as a whitelist of benign samples. In response to determining that the sample is comprised in the set of samples on the whitelist of benign samples, the system determines that the sample is not malicious.

According to various embodiments, in response to determining the traffic sample is not comprised in a set of previously identified malicious samples (e.g., a blacklist of malicious samples) or a set of previously identified benign samples (e.g., a whitelist of benign files), the system deems the traffic sample as being non-malicious (e.g., benign).

According to various embodiments, in response to determining the traffic sample is not comprised in a set of previously identified malicious samples (e.g., a blacklist of malicious samples) or a set of previously identified benign samples (e.g., a whitelist of benign samples), the system queries a malicious traffic detector to determine whether the traffic is malicious (e.g., to perform automatic C2 traffic detection). For example, the system may quarantine the traffic until the system receives response form the malicious traffic detector as to whether the traffic sample is malicious. The malicious traffic detector may perform an assessment of whether the traffic sample is malicious contemporaneous with the handling of the traffic by the system (e.g., in real-time with the query from the system). The malicious traffic detector may correspond to network traffic classifier 170 of system 100 of FIG. 1 and/or system 200 of FIG. 2.

In some embodiments, the system determines whether the traffic sample is comprised in the set of previously identified malicious samples or the set of previously identified benign samples by computing a hash or determining a signature or other unique identifier associated with the sample (e.g., an IP address for the device from which the HTTP request originated), and performing a lookup in the set of previously identified malicious samples or the set of previously identified benign samples for a sample (e.g., an HTTP request) matching the hash, signature or other unique identifier. Various hashing techniques may be implemented.

In response to a determination that the traffic is not malicious traffic at 1020, process 1000 proceeds to 1030 at which the traffic is handled as non-malicious traffic/information.

In response to a determination that the traffic sample is malicious at 1020, process 1000 proceeds to 1025 at which the traffic is handled as malicious traffic/information. The system may handle the malicious traffic/information based at least in part on one or more policies such as one or more security policies.

According to various embodiments, the handling of the malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious traffic, etc. Examples of active measures that may be performed include: isolating the traffic (e.g., quarantining the traffic), deleting the traffic, prompting the user to alert the user that a malicious traffic was detected, blocking transmission of the traffic, updating a blacklist of malicious samples (e.g., a mapping of a hash for the traffic sample to an indication that the traffic sample is malicious, etc.).

At 1035, a determination is made as to whether process 1000 is complete. In some embodiments, process 1000 is determined to be complete in response to a determination that no further samples are to be analyzed (e.g., no further predictions for traffic are needed), an administrator indicates that process 1000 is to be paused or stopped, etc. In response to a determination that process 1000 is complete, process 1000 ends. In response to a determination that process 1000 is not complete, process 1000 returns to 1005.

Figure 11:
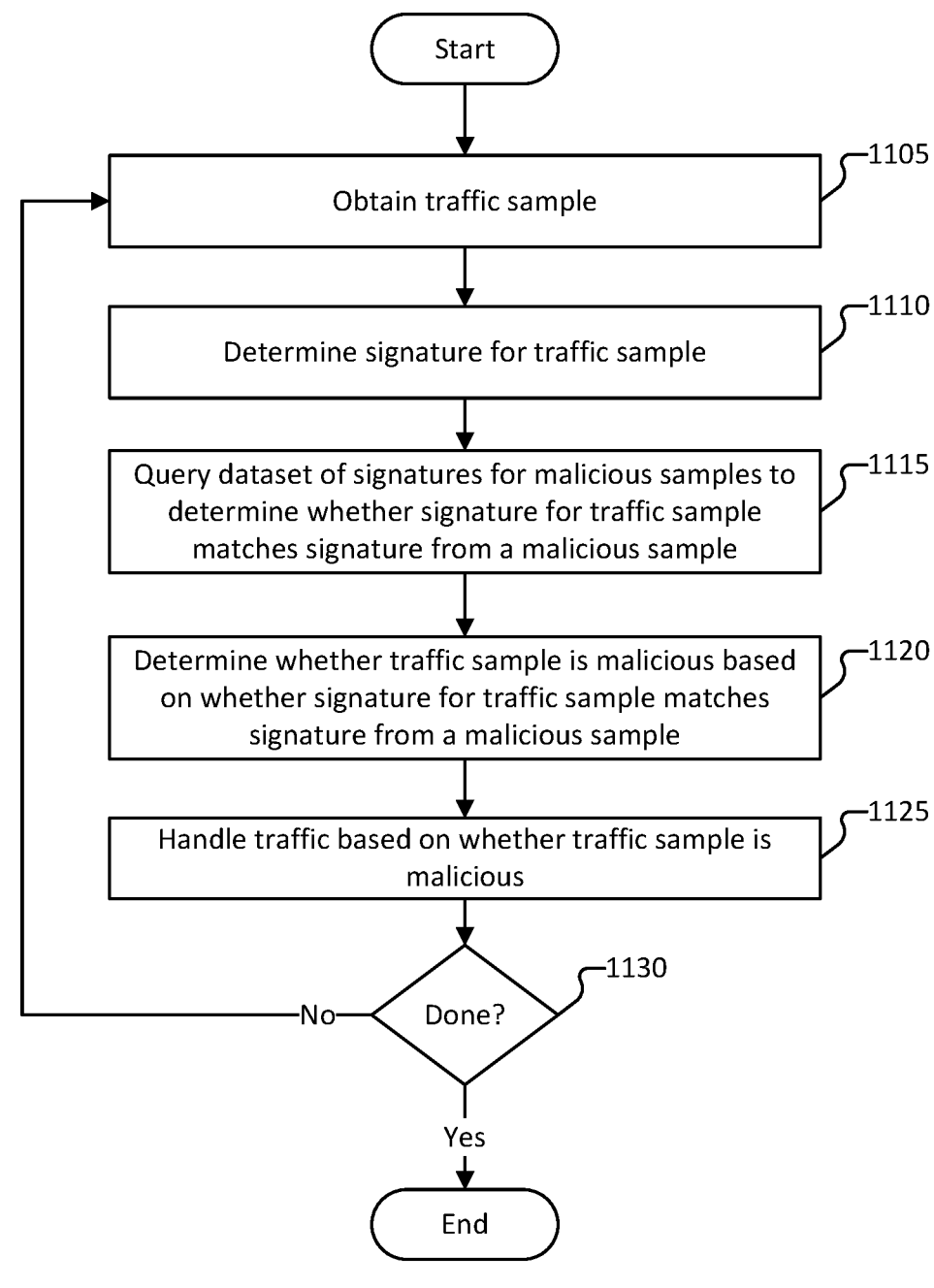
FIG. 11 is a flow diagram of a method for detecting malicious traffic according to various embodiments.

FIG. 11 is a flow diagram of a method for detecting malicious traffic according to various embodiments. In some embodiments, process 1100 is implemented at least in part on by system 100 of FIG. 1 and/or system 200 of FIG. 2. In some implementations, process 1100 may be implemented by a security entity (e.g., a firewall) such as in connection with enforcing a security policy with respect to traffic communicated across a network or in/out of the network, and/or an anti-malware application running on a client system, etc. In some implementations, process 1100 may be implemented by a client device such as a laptop, a smartphone, a personal computer, etc.

In some embodiments, process 1100 is invoked by 1020 of process 1000 of FIG. 10.

At 1105 a traffic sample is obtained from traffic. The system may obtain traffic such as in connection with routing traffic within/across a network, or mediating traffic into/out of a network such as a firewall, or a monitoring of email traffic or instant message traffic. In some embodiments, the system obtains the traffic sample from the received traffic.

At 1110, a signature corresponding to the traffic sample is determined. In some embodiments, the system computes a hash or determines a signature or other unique identifier associated with the traffic sample, such as based on the header information comprised in the traffic sample (e.g., a normalized header for an HTTP request). Various hashing techniques may be implemented. For example, the hashing technique may be the determining (e.g., computing) the MD5 hash for the header/header information comprised in the traffic sample (e.g., the HTTP request).

At 1115, a dataset for signatures of malicious samples is queried to determine whether the signature corresponding to the traffic sample matches a signature from a malicious sample. In some embodiments, the system performs a lookup in the dataset for signatures of malicious samples for a file matching the hash, signature or other unique identifier. The dataset for signatures of malicious samples may be stored locally at the system or remotely on a storage system that is accessible to the system.

At 1120, a determination of whether the traffic sample is malicious is made based at least in part on whether a signature for the traffic sample matches a signature for a malicious sample. In some embodiments, the system determines whether the dataset of malicious signature comprises a record matching the signature for the traffic sample obtained from traffic. In response to determining that the historical dataset indicates that a hash for the traffic sample is comprised in the dataset for signatures of malicious samples (e.g., the hash of the traffic sample is included in a blacklist of samples), the system deems the traffic sample obtained from the traffic at 1005 to be malicious.

At 1125, the traffic is handled according to whether the traffic sample is malicious. In some embodiments, in response to determining that the traffic sample is malicious, the system applies one or more security policies with respect to the traffic. In some embodiments, in response to determining that the traffic sample is not malicious, the system handles the traffic as being benign (e.g., the traffic is handled as normal traffic).

At 1130, a determination is made as to whether process 1100 is complete. In some embodiments, process 1100 is determined to be complete in response to a determination that no further samples or traffic are to be analyzed (e.g., no further predictions for traffic are needed), an administrator indicates that process 1100 is to be paused or stopped, etc. In response to a determination that process 1100 is complete, process 1100 ends. In response to a determination that process 1100 is not complete, process 1100 returns to 1105.

Figure 12:
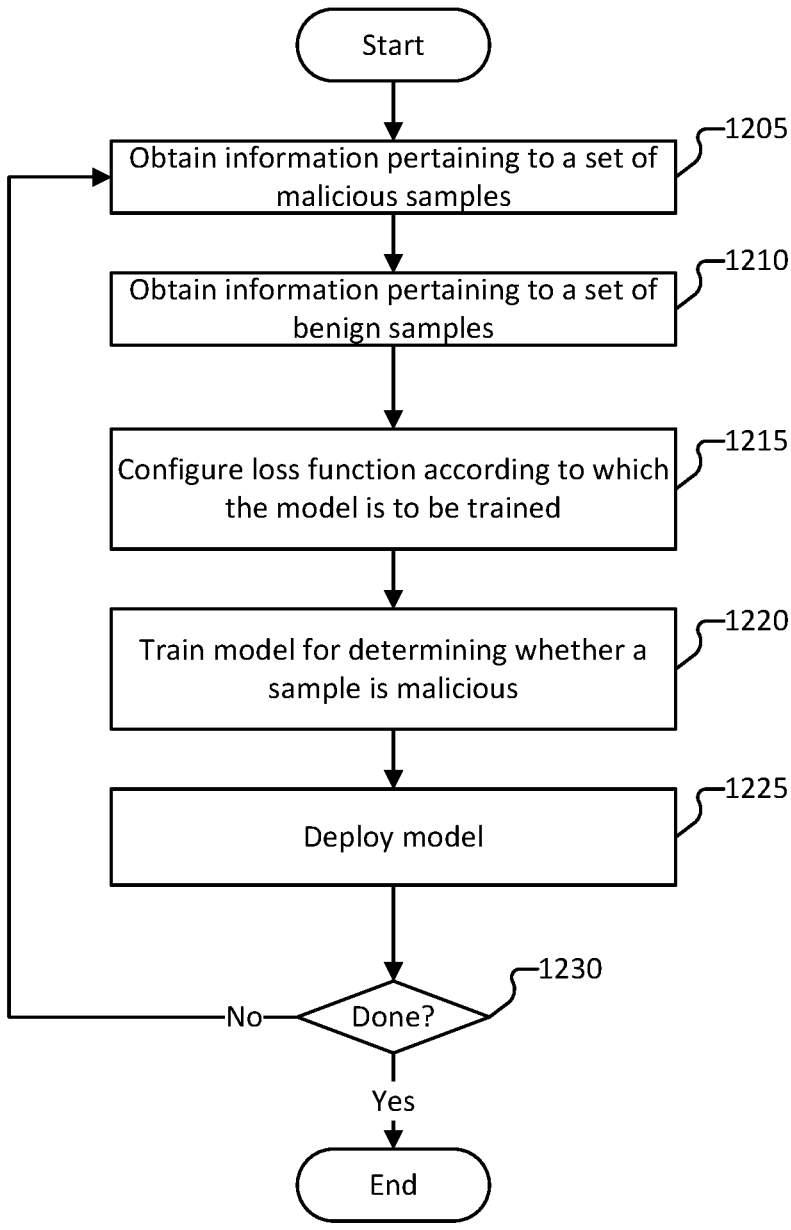
FIG. 12 is a flow diagram of a method for training a model according to various embodiments.

FIG. 12 is a flow diagram of a method for training a model according to various embodiments. In some embodiments, process 1200 is implemented at least in part on by system 100 of FIG. 1 and/or system 200 of FIG. 2.

At 1205, information pertaining to a set of historical malicious samples is obtained. In some embodiments, the system obtains the information pertaining to a set of historical malicious samples from a third-party service (e.g., VirusTotal™). The system collects sample network traffic, including malicious traffic such as C2 traffic. As an example, the system collects multiple types of C2 traffic, including Cobalt Strike, Empire, Covenant, etc. At 1210, information pertaining to a set of historical benign samples is obtained. In some embodiments, the system obtains the information pertaining to a set of historical benign samples from a third-party service (e.g., VirusTotal™). The system collects benign traffic, such as based on samples for which malicious traffic detection was previously performed (e.g., using one or more machine learning models, etc.). At 1215, a loss function according to which the model is to be trained is configured. At 1220, a model is trained for determining whether a sample is malicious (e.g., whether a traffic sample is C2 traffic). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model is trained using a CNN model. The model may be trained to detect a particular type of C2 traffic (e.g., each model is trained to detect a different type of C2 framework). Alternatively, the model may be trained to detect C2 traffic for a plurality of C2 traffic (e.g., the payload is normalized for different types of C2 frameworks, and the normalized payload is used to train the model). At 1225, the model is deployed. In some embodiments, the deploying of the model includes storing the model in a dataset of models for use in connection with analyzing traffic to determine whether the traffic is malicious. The deploying the model can include providing the model (or a location at which the model can be invoked) to a malicious traffic detector, such as network traffic classifier 170 of system 100 of FIG. 1, or to system 200 of FIG. 2.

At 1230, a determination is made as to whether process 1200 is complete. In some embodiments, process 1200 is determined to be complete in response to a determination that no further models are to be determined/trained (e.g., no further classification models are to be created), an administrator indicates that process 1200 is to be paused or stopped, etc. In response to a determination that process 1200 is complete, process 1200 ends. In response to a determination that process 1200 is not complete, process 1200 returns to 1205.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting Command and Control (C2) traffic, comprising:
   one or more processors configured to:
      convert a monitored traffic sample to an image representation;
      query a classifier based at least in part on the image representation to obtain a traffic classification;
      automatically detect C2 traffic based at least in part on the traffic classification; and
      handle network traffic based at least in part on the traffic classification; and
   a memory coupled to the one or more processors and configured to provide the one or more processors with instructions.

2. The system of claim 1, wherein the image representation is based on a two-dimensional array of information obtained from the monitored traffic sample.

3. The system of claim 2, wherein the image representation is obtained based at least in part on a first HTTP header of a payload for the monitored traffic sample.

4. The system of claim 2, wherein a dimension of the two-dimensional array of information is 128 or less.

5. The system of claim 2, wherein the two-dimensional array of information comprises a dimensionality of 64×64.

6. The system of claim 1, wherein the classifier is a deep learning model.

7. The system of claim 6, wherein the classifier is a 2D convolutional neural network.

8. The system of claim 1, wherein the classifier is trained to learn features to differentiate C2 traffic from benign traffic.

9. The system of claim 1, wherein the C2 traffic comprises two or more of: (i) C2 traffic having a cobalt strike format, (ii) C2 traffic having an empire format, (iii) C2 traffic having a silver format, and (iv) C2 traffic having a covenant format.

10. The system of claim 1, wherein converting the monitored traffic sample to the image representation comprises:
   obtaining a first request header in a network traffic session;
   extracting a byte stream from the first request header; and
   generating the image representation based at least in part on the byte stream.

11. The system of claim 10, wherein the byte stream is one dimensional, and the generating the image representation based at least in part on the byte stream comprises:
   resizing the byte stream to a two-dimensional matrix;
   square the two-dimensional matrix; and
   convert the two-dimensional matrix to the image representation.

12. The system of claim 11, wherein squaring the two-dimensional matrix comprises padding the two-dimensional matrix with zeros, or trimming the byte stream to make the two-dimensional matrix a square matrix.

13. The system of claim 1, wherein training the classifier comprises applying pooling of feature scores to reduce overfitting.

14. The system of claim 1, wherein training the classifier comprises applying fully connected neural networks on feature scores to predict a label of a session based on a probabilistic score.

15. The system of claim 14, wherein the training the classifier comprises minimizing an entropy-based loss function to update the feature scores with penalties for misclassification.

16. The system of claim 1, wherein the network traffic is handled according to a predefined security policy.

17. The system of claim 1, wherein the classifier is a convolutional neural network (CNN) model.

18. The system of claim 1, wherein the classifier performs traffic classification for a plurality of types of C2 traffic having different header formats.

19. The system of claim 1, wherein the plurality of types of C2 traffic comprise two or more of (i) C2 traffic having a cobalt strike format, (ii) C2 traffic having an empire format, (iii) C2 traffic having a silver format, and (iv) C2 traffic having a covenant format.

20. The system of claim 1, wherein the classifier is implemented by cloud-based security entity.

21. The system of claim 20, wherein the security entity is a firewall configured to perform inline C2 traffic detection.

22. The system of claim 1, wherein the one or more processors are further configured to compute a signature for newly detected C2 traffic.

23. A method for detecting Command and Control (C2) traffic, comprising:

converting, by one or more processors, a monitored traffic sample to an image representation;

querying a classifier based at least in part on the image representation to obtain a traffic classification;

automatically detecting C2 traffic based at least in part on the traffic classification; and handling network traffic based at least in part on the traffic classification.

24. A computer program product embodied in a non-transitory computer readable medium for detecting Command and Control (C2) traffic, and the computer program product comprising computer instructions for:

converting, by one or more processors, a monitored traffic sample to an image representation;

querying a classifier based at least in part on the image representation to obtain a traffic classification;

automatically detecting C2 traffic based at least in part on the traffic classification; and handling network traffic based at least in part on the traffic classification.

* * * * *